(12) United States Patent
Shestak et al.

(10) Patent No.: US 8,284,241 B2
(45) Date of Patent: Oct. 9, 2012

(54) HIGH RESOLUTION AUTOSTEREOSCOPIC DISPLAY APPARATUS WITH INTERLACED IMAGE

(75) Inventors: Sergey Shestak, Suwon-si (KR); Dae-sik Kim, Suwon-si (KR); Sung-yong Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1583 days.

(21) Appl. No.: 11/783,303

(22) Filed: Apr. 9, 2007

(65) Prior Publication Data

US 2008/0036853 A1 Feb. 14, 2008

Related U.S. Application Data

(60) Provisional application No. 60/797,373, filed on May 4, 2006.

(30) Foreign Application Priority Data

Jul. 19, 2006 (KR) .................. 10-2006-0067301

(51) Int. Cl.
*H04N 13/04* (2006.01)
*H04N 15/00* (2006.01)

(52) U.S. Cl. ............ 348/51; 348/E13.029; 348/E15.001
(58) Field of Classification Search .............. 348/51–59; 359/462–465, 471, 485.03, 493.01
See application file for complete search history.

(56) References Cited

U.S. PATENT DOCUMENTS

| | | | |
|---|---|---|---|
| 5,969,850 A | | 10/1999 | Harrold et al. |
| 6,859,240 B1 * | | 2/2005 | Brown et al. ................... 349/15 |
| 6,940,646 B2 | | 9/2005 | Taniguchi et al. |
| 7,227,568 B2 * | | 6/2007 | Sun et al. ................... 348/58 |
| 7,609,445 B2 * | | 10/2009 | Hamagishi ................... 359/463 |
| 2002/0118452 A1 | | 8/2002 | Taniguchi et al. |

FOREIGN PATENT DOCUMENTS

| | | |
|---|---|---|
| EP | 0788008 A1 | 8/1997 |
| JP | 2004-325494 A | 11/2004 |
| KR | 2003-0036765 A | 5/2003 |
| KR | 10-2005-0038482 A | 4/2005 |

OTHER PUBLICATIONS

Communication, dated Dec. 23, 2011, issued by the European Patent Office in corresponding European Application No. 07746047.5.

* cited by examiner

*Primary Examiner* — Ranodhi Serrao
*Assistant Examiner* — Thomas Richardson
(74) *Attorney, Agent, or Firm* — Sughrue Mion, PLLC

(57) ABSTRACT

An autostereoscopic display apparatus includes a backlight unit, a polarizing plate disposed in front of the backlight unit; a display panel displaying a left eye image and a right eye image by interlacing pixel lines of the left and right eye images alternately and sequentially; a lenticular lens sheet, disposed between the polarizing plate and the display panel, separating light emitted from the backlight unit into a left eye zone and a right eye zone; and a polarization switch controlling a polarization direction of light proceeding towards the left eye viewing zone so that light is incident on pixel lines of the display panel displaying the left eye image and a polarization direction of light proceeding towards the right eye viewing zone so that light is incident on pixel lines of the display panel displaying the right eye image, in synchronization with a vertical scanning time of the display panel.

35 Claims, 21 Drawing Sheets

FIG. 4A (RELATED ART)
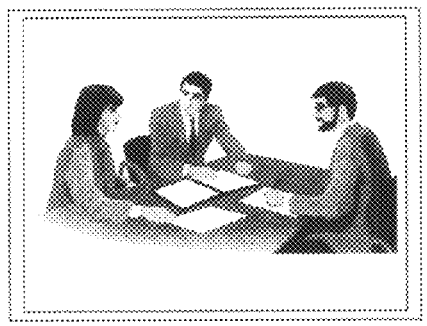
LEFT IMAGE
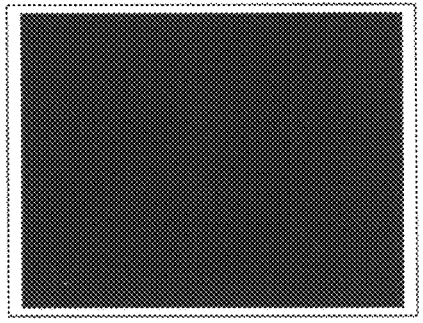
RIGHT IMAGE
FIG. 4B (RELATED ART)
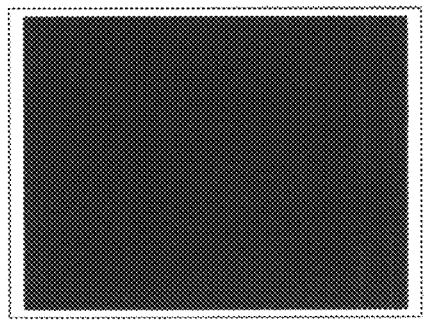
LEFT IMAGE
RIGHT IMAGE FIG. 8
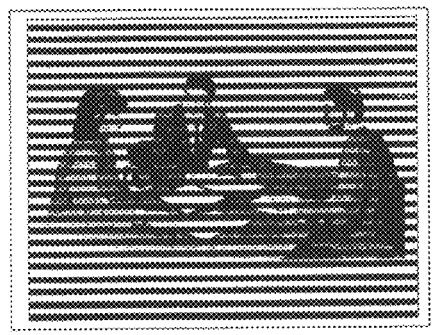
LEFT IMAGE
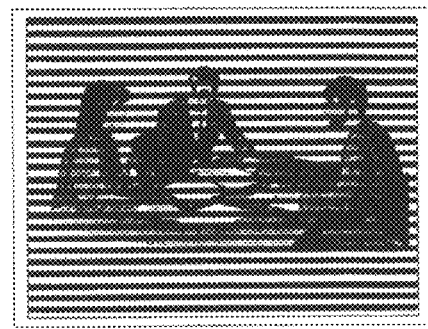
RIGHT IMAGE FIG. 10
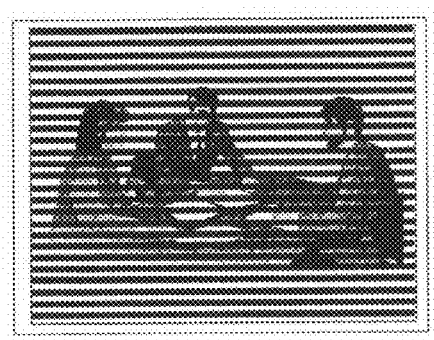
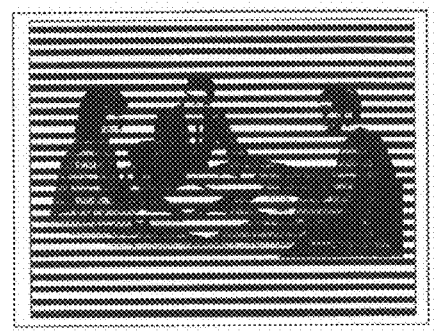
LEFT IMAGE          RIGHT IMAGE

HIGH RESOLUTION AUTOSTEREOSCOPIC DISPLAY APPARATUS WITH INTERLACED IMAGE

CROSS-REFERENCE TO RELATED PATENT APPLICATIONS

This application claims the benefit of Korean Patent Application No. 10-2006-0067301, filed on Jul. 19, 2006, in the Korean Intellectual Property Office, and the benefit of U.S. Provisional Patent Application No. 60/797,373, filed on May 4, 2006, in the U.S. Patent and Trademark Office, the disclosures of which are incorporated herein in their entirety by reference.

BACKGROUND OF THE INVENTION

1. Field of the Invention

Apparatuses consistent with the present invention relate to a high resolution autostereoscopic display, and more particularly, to a high resolution autostereoscopic display apparatus in which resolution is not decreased and cross talk does not occur as an image is displayed in an interlaced method.

2. Description of the Related Art

An autostereoscopic display apparatus is used to display an image for the left eye and an image for the right eye that exhibit binocular parallax respectively to the left and right eyes of a viewer. The viewer can view a 3-D image by recognizing the left eye image and the right eye image provided by the autostereoscopic display apparatus through the retinas of both eyes. Autostereoscopic display apparatuses include apparatuses using a parallax barrier method and apparatuses using a lenticular method.

According to the parallax barrier method, the images that are to be viewed by the left and right eyes are alternately displayed in a vertical pattern and the displayed images are viewed using a very thin vertical grid, that is, a barrier. In this way, the vertical pattern image for the left eye and the vertical pattern image for the right eye are divided by the barrier so that images of different view points are viewed by the left and right eyes, thus forming an autostereoscopic image. Also, as illustrated in FIG. 1, a related art lenticular type autostereoscopic display apparatus includes a display panel 11, alternately displaying image signals for the left and right eyes, and a lenticular sheet 12, installed in front of the display panel 11, which separates the images for the left and right eyes.

However, since the images for the left and right eyes are simultaneously displayed by a single display panel 11 for the above related art lenticular type autostereoscopic display apparatus, the resolution of a stereoscopic image viewed by a user is reduced to ½ of the original resolution of the display panel 11. Also, in order to enable a switching action between a 2-D image mode and a 3-D image mode, a very complicated additional structure is needed.

Thus, a time-sharing type autostereoscopic display apparatus has been developed that can provide a stereoscopic image without a decrease in the resolution, using a high speed responsive liquid crystal display (LCD) having a refresh rate of 120 Hz.

For example, Japanese Patent Publication No. 2004-325494 discloses an autostereoscopic display apparatus having a display panel, an image separating unit, and a light deflecting unit. In the related art autostereoscopic display apparatus of the above mentioned publication, the display panel periodically shifts, by a pixel, the left and right images that are alternately displayed. A related art image separating unit such as a parallax barrier arranged on the front surface of the display panel separates the left and right images that are alternately displayed by the display panel. At this point, the light deflecting unit that is periodically shifted in synchronization with the left and right shift period of the display panel deflects an image for the left eye to the left eye and an image for the right eye to the right eye. With such an autostereoscopic display apparatus, since the positions where the images for the left and right eyes are displayed switch at a high speed, a user hardly notices any degradation in resolution. However, there is a problem in that the light deflecting unit formed of ferroelectric liquid crystal is very expensive and the loss of light due to the parallax barrier is high.

U.S. Pat. No. 5,969,850 discloses an autostereoscopic display apparatus 20 which includes a backlight unit 21, a spatial light modulator 22, a lenticular lens sheet 23, and a high speed responsive LCD display panel 26, as illustrated in FIG. 2. The spatial light modulator 22 is formed of a plurality of left eye and right eye cells 24 and 25 that switch between a transparent state and an opaque state according to the ON/OFF state of power. In the autostereoscopic display apparatus 20, the high speed responsive LCD display panel 26 alternately displays the images for the left eye over the whole screen in a very fast time period. The spatial light modulator 22 switches the cells 24 and 25 in synchronization with the left and right image switching time of the high speed responsive LCD display panel 26. For example, while the high speed responsive LCD display panel 26 displays the images for the left eye, the spatial light modulator 22 switches the left eye cell 24 to a transparent state so that the light emitted from the backlight unit 21 is directed only towards a left eye viewing zone 28 of a user. Also, while the high speed responsive LCD display panel 26 displays the right eye image, the spatial light modulator 22 turns on the right eye cell 25 so that the light emitted from the backlight unit 21 is directed only towards a right eye viewing zone 27 of the user. In a conventional 2-D mode, all the left eye and right eye cells 24 and 25 of the spatial light modulator 22 are turned on.

However, in the time-sharing type methods of the above-discussed Japanese publication and U.S. patent, cross talk is generated between the left eye image and the right eye image so that the user is not able to view an accurate 3-D image. In general, most display panels sequentially scan an image of a frame from the top of a screen to the bottom. While an image of a previous frame is displayed on the lower side of the screen, an image of the subsequent frame is displayed on the upper side of the screen. For example, when the period for the complete scanning of a frame is T, as illustrated in FIG. 3, a right eye image is displayed in the whole screen at a time "0" and a left eye image is displayed in the whole screen at a time "T". However, since the right eye image continuously changes into the left eye image between the time "0" and "T", the left eye image is displayed on the upper side of the screen while the right eye image is displayed on the lower side of the screen. As a result, there is a time that the left eye image and the right eye image share the screen. Thus, as in the time-sharing type method U.S. patent, when the left eye and right eye cells 24 and 25 of the spatial light modulator 22 are simply turned on and off alternately, the left eye image and the right eye image are not completely separate and sensed by the left and right eyes of a user at the same time.

Also, the above-described Japanese publication and U.S. patent have a problem of using an expensive high speed responsive LCD display panel in order to prevent a flickering phenomenon. In order to prevent the flickering phenomenon, a related art autostereoscopic display apparatus can display an image at a scanning speed of about 50-60 Hz or more. For the above described autostereoscopic display apparatuses, as illustrated in FIG. 4A, at an instant, an image is only viewed by the left eye while no image is viewed by the right eye. Also, as illustrated in FIG. 4B, at another instant, an image is only viewed by the right eye while no image is viewed by the left eye. As a result, when a conventional LCD display panel having a vertical scanning speed of about 60-75 Hz is used, the flickering phenomenon is generated since the left and right eyes can view an image that is displayed at a scanning speed of 30-37.5 Hz. Thus, the conventional LCD display panel having a vertical scanning speed of 60-75 Hz cannot be used for the related art time-sharing type autostereoscopic display apparatus.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Exemplary embodiments of the present invention provide a high resolution autostereoscopic display apparatus having no decrease in resolution and no generation of crosstalk.

Exemplary embodiments of the present invention also provide a high resolution autostereoscopic display apparatus with an interlaced image that can use a conventional LCD panel, that is, not using an expensive high speed responsive LCD.

According to an aspect of the present invention, an autostereoscopic display apparatus comprises a backlight unit, a polarizing plate disposed in front of the backlight unit, a display panel displaying a left eye image and a right eye image by interlacing pixel lines of the left and right eye images alternately and sequentially, a lenticular lens sheet disposed between the polarizing plate and the display panel and separating light emitted from the backlight unit into a left eye viewing zone 28 and a right eye viewing zone, and a polarization switch controlling a polarization direction of light proceeding towards the left eye viewing zone 28 so that the light is incident on a pixel line of the display panel displaying the left eye image and controlling a polarization direction of light proceeding towards the right eye viewing zone 27 so that the light is incident on a pixel line of the display panel displaying the right eye image, in synchronization with a vertical scanning time of the display panel.

The polarization switch may include a spatial light modulator disposed between the polarizing plate and the lenticular lens sheet and capable of switching between first through third statuses in which the polarization direction of incident light changes according to electric control, a first birefringent element array disposed between the spatial light modulator and the lenticular lens sheet, having a plurality of first and second vertical birefringent elements that alternate in the horizontal direction, and changing the polarization direction of incident light so that the polarization direction of light passing through the first birefringent elements is perpendicular to the polarization direction of light passing through the second birefringent elements, and a second birefringent element array disposed between the lenticular lens sheet and the display panel, having a plurality of third and fourth horizontal birefringent elements that alternate in the vertical direction, and changing the polarization direction of incident light so that the polarization direction of light passing through the third birefringent elements is perpendicular to the polarization direction of light passing through the fourth birefringent elements.

The third and fourth birefringent elements of the second birefringent element array may each correspond one of the pixel lines of the display panel.

The second birefringent element array may further comprise an opaque mask having a striped shape disposed between the third and fourth birefringent elements.

A black matrix may be disposed between pixels of the display panel, and when a width of the black matrix is $D_2$, a width of the opaque mask is $D_1$, a distance between the pixel of the display panel and the second birefringent element array is t, and a viewing distance from the display panel is L, a height H2 of a viewing zone having no cross talk may satisfy an equation where $H2=(L/t)(D_1+D_2)$.

A pitch in the vertical direction between the third and fourth birefringent elements of the second birefringent element array may be slightly greater than a pitch in the vertical direction between pixel lines of the display panel.

Each of the first through fourth birefringent elements may each comprise a polarizer having a predetermined polarization plane, such that the polarization plane of polarizers forming the first birefringent elements and the polarization plane of polarizers forming the second birefringent elements may be perpendicular to each other, and the polarization plane of polarizers forming the third birefringent elements and the polarization plane of polarizers forming the fourth birefringent elements may be perpendicular to each other.

Each of the first through fourth birefringent elements may each comprise a retarder that delays the incident light by a predetermined phase, such that a phase delay difference between the retarders forming the first and second birefringent elements may be $\lambda/2$, and a phase delay difference between the retarders forming the third and fourth birefringent elements may be $\lambda/2$.

Each of the first through fourth birefringent elements may each comprise a rotator that rotates the incident light by a predetermined angle, such that a rotation angle difference between the rotators forming the first and second birefringent elements may be $\lambda/2$, and a rotation angle difference between the rotators forming the third and fourth birefringent elements may be $\lambda/2$.

The spatial light modulator may switch between the first status in which the polarization state of the incident light does not change, the second status in which the polarization direction of the incident light changes to circularly polarized light, and the third status in which the polarization direction of the incident light changes by 90°.

The spatial light modulator may be a crystal liquid retarder that is electrically controllable.

According to the present invention, when the spatial light modulator is in the first status, the light passing through the third birefringent elements may proceed towards the first viewing zone and the light passing through the fourth birefringent elements may proceed towards the second viewing zone.

Also, when the spatial light modulator is in the third status, the light passing through the third birefringent elements may proceed towards the second viewing zone and the light passing through the fourth birefringent elements may proceed towards the first viewing zone.

The lenticular lens sheet may comprise a plurality of vertical lenticular lens elements arranged along the horizontal direction and parallel to the first and second birefringent elements of the first birefringent element array.

A pitch between the vertical lenticular lens elements of the lenticular lens sheet may be the same as or less than a pitch between pairs of the first and second birefringent elements of the first birefringent element array.

A distance between the lenticular lens sheet and the first birefringent element array may be the same as or greater than a focal length of the vertical lenticular lens element.

The lenticular lens sheet may allow the light passing through the first birefringent elements to proceed towards the first viewing zone and the light passing through the second birefringent elements to proceed towards the second viewing zone.

The backlight unit and the spatial light modulator may be divided into a plurality of horizontal segments that are sequentially switched in synchronization with a vertical scanning time of the display panel.

The backlight unit and the spatial light modulator may be divided such that a plurality of horizontal segments that are capable of being independently switched are arranged along the vertical direction, and the number of segments of the backlight unit may be the same as the number of segments of the spatial light modulator.

The corresponding segments of the backlight unit and the spatial light modulator may be simultaneously switched.

A horizontal segment of each of the backlight unit and the spatial light modulator may correspond to a plurality of pixel lines of the display panel.

The display panel may display an image for the first viewing zone of a first frame in odd pixel lines and an image for the second viewing zone of the first frame in even pixel lines and the image for the first viewing zone of a second frame in the even pixel lines and the image for the second viewing zone of the second frame in the odd pixel lines.

In each horizontal segment of the spatial light modulator, the first and third statuses may be time-sequentially and alternately switched in synchronization with the display panel.

according to another aspect of the present invention, the polarization switch may comprise a spatial light modulator disposed between the polarizing plate and the lenticular lens sheet and comprising a plurality of first vertical columns and second vertical columns that change the polarization direction of incident light by being independently controlled and alternately provided, and a birefringent element array disposed between the lenticular lens sheet and the display panel, comprising a plurality of first and second horizontal birefringent elements that alternate in the vertical direction, and change the polarization direction of incident light such that the polarization directions of light passing through the first and second birefringent elements are perpendicular to each other.

The spatial light modulator may be switched between the first status in which the first vertical columns do not change the polarization direction of incident light and the second vertical columns change the polarization direction of incident light by +90° or −90° and the second status in which the first vertical columns change the polarization direction of incident light by +90° or −90° and the second vertical columns do not change the polarization direction of incident light.

The spatial light modulator may comprises a liquid crystal layer, first and second vertical column electrodes arranged in the vertical direction on a front surface of the liquid crystal layer, facing each other in an interdigit array, and a common electrode arranged on a rear surface of the liquid crystal layer, wherein the common electrode may be divided into a plurality of horizontal segments.

According to another aspect of the present invention, an autostereoscopic display apparatus comprises a backlight unit, a lenticular lens sheet separating light emitted from the backlight unit into a left eye viewing zone and a right eye viewing zone, a display panel displaying a left eye image and a right eye image by interlacing pixel lines of the left and right eye images alternately and sequentially, and a spatial light modulator disposed between the backlight unit and the lenticular lens sheet and comprising a plurality of cells that can independently switch between a transparent state and an opaque state in synchronization with a vertical scanning time of the display panel, wherein the cells of the spatial light modulator are arranged in two dimensions along rows and columns.

The spatial light modulator may switch between a first status in which all cells are transparent, a second status in which transparent cells and opaque cells are arranged in a checkered pattern, and a third status in which the transparent cells in the second status are opaque and the opaque cells in the second status are transparent.

The display panel may display the left eye image of a first frame in odd pixel lines and the right eye image of the first frame in even pixel lines and the left eye image of a second frame in the even pixel lines and the right eye image of the second frame in the odd pixel lines.

The spatial light modulator may be switched between the second and third statuses sequentially and line by line in synchronization with a vertical scanning time of the display panel.

The number of cells in the vertical direction of the spatial light modulator may be the same as that of the pixel lines of the display panel.

The lenticular lens sheet may comprise a plurality of vertical lenticular lens elements disposed along the horizontal direction and parallel to the spatial light modulator.

A width of a lens element of the lenticular lens sheet may be the same as or greater than a width of two cells of the spatial light modulator.

A distance between the lenticular lens sheet and the spatial light modulator may be the same as or greater than a focal length of the vertical lenticular lens element.

An opaque mask having a stripe shape may be disposed in the horizontal direction between rows of the cells of the spatial light modulator.

A pitch in the vertical direction of the horizontal opaque mask of the spatial light modulator may be the greater than a pitch between the pixel lines of the display panel.

BRIEF DESCRIPTION OF THE DRAWINGS

The above and other aspects of the present invention will become more apparent by the following detailed description of exemplary embodiments thereof with reference to the attached drawings in which:

FIGS. 4A and 4B illustrate images recognized by the left and right eyes in the related art autostereoscopic display apparatus illustrated in FIG. 2;

FIG. 8 illustrates the images recognized by the left and right eyes in the case of the high resolution autostereoscopic display apparatus of FIG. 7;

FIG. 10 illustrates the images recognized by the left and right eyes in the case of FIG. 9;

DETAILED DESCRIPTION OF EXEMPLARY EMBODIMENTS OF THE INVENTION

Figure 1:
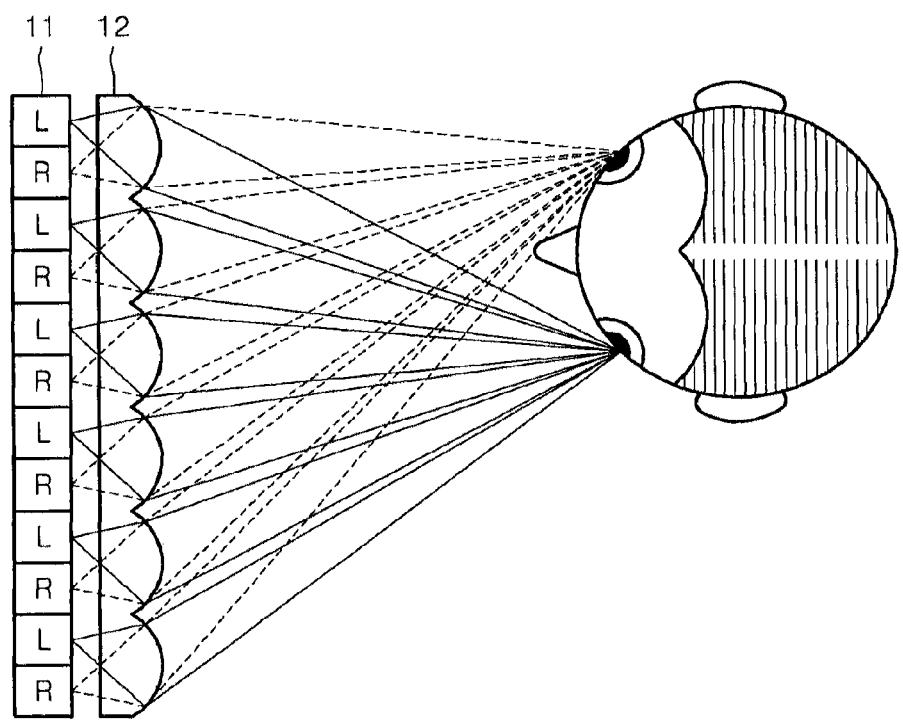
FIG. 1 schematically illustrates a related art lenticular type autostereoscopic display apparatus.
Figure 2:
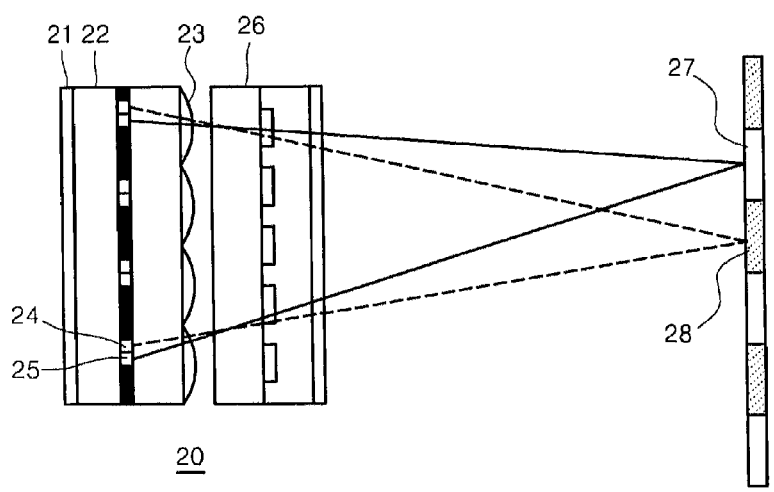
FIG. 2 schematically illustrates a related art autostereoscopic display apparatus having no decrease in resolution.
Figure 3:
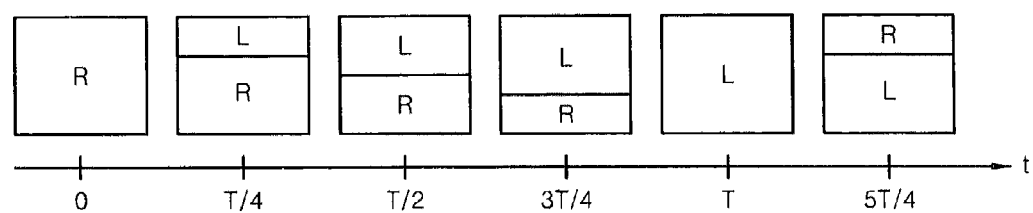
FIG. 3 illustrates a related art step of scanning images for the left and right eyes in a display panel.
Figure 5:
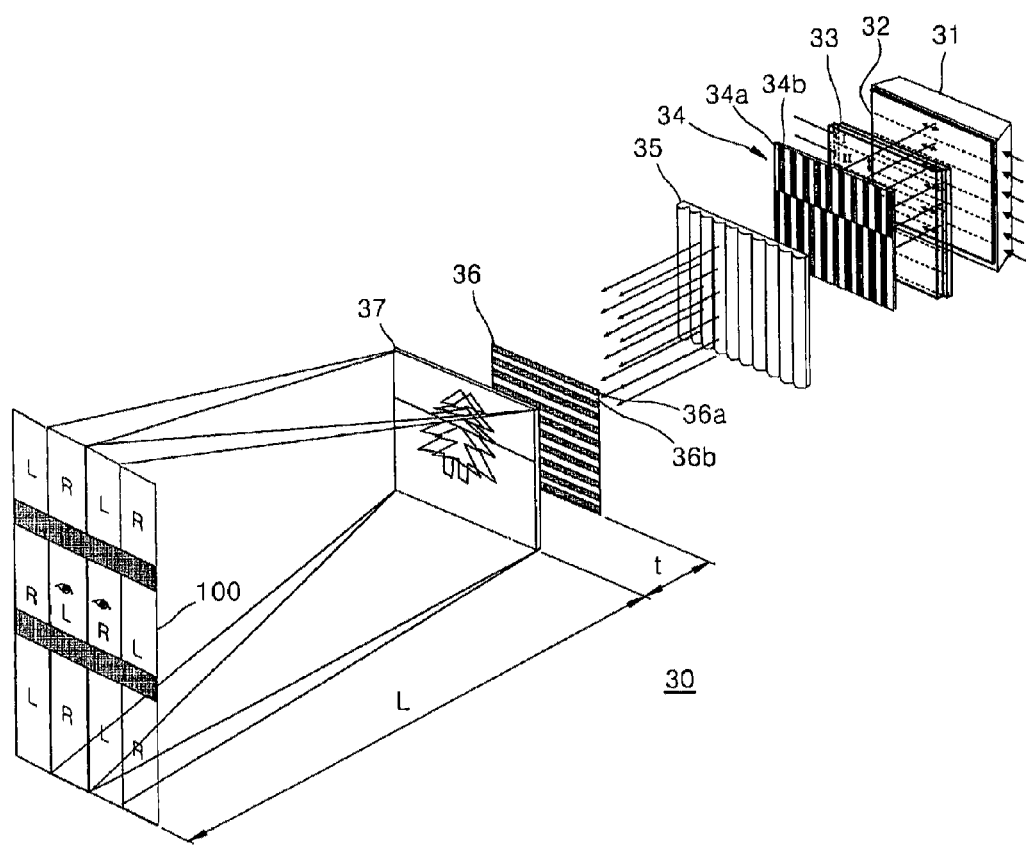
FIG. 5 is an exploded perspective view schematically illustrating the structure of a high resolution autostereoscopic display apparatus according to an exemplary embodiment of the present invention.

FIG. 5 is an exploded perspective view schematically illustrating the structure of a high resolution autostereoscopic display apparatus 30 according to an exemplary embodiment of the present invention. Referring to FIG. 5, the high resolution autostereoscopic display apparatus 30 in the present embodiment includes a division type backlight unit 31; a polarizing plate 32 which only transmits light, incident from the backlight unit 31, having a particular polarization direction; a spatial light modulator 33 changing the polarization direction of incident light according to electric control; a first birefringent element array 34 in which a plurality of first and second vertical birefringent elements 34a and 34b, alternately arranged along the horizontal direction, which change the polarization direction of incident light; a lenticular lens sheet 35 separating the incident light into a left eye viewing zone and a right eye viewing zone; a second birefringent element array 36 in which a plurality of third and fourth horizontal birefringent elements 36a and 36b are alternately arranged along the vertical direction; and an LCD panel 37 displaying an image.

According to the present embodiment, the spatial light modulator 33 may be switched between a first status, a second status, and a third status, in which the polarization direction of light passing through the spatial light modulator 33 is different respectively by 45°. For example, the spatial light modulator 33 has a first status in which the polarization direction of incident light is not converted, a second status in which the polarization direction of incident light is converted by +45°, and a third status in which the polarization direction of incident light is converted by +90°. However, since the conversion angle of the polarization direction in each status of the spatial light modulator 33 is exemplary, the conversion angle can be differently designed according to the polarization directions of the polarizing plate 32 and polarizers of the LCD panel 37. It is satisfactory that the difference between the polarization directions of light is 45° when the spatial light modulator 33 is in each of the first, second, and third statuses. Also, the spatial light modulator 33 may be designed such that in the second status, the light is circularly polarized light, not linearly polarized light.

The spatial light modulator 33 includes an electrically controllable device having three anisotropic states according to the amount of applied voltage. For example, a liquid crystal retarder that is formed of an optical compensation bend (OCB) twist nematic liquid crystal panel or a ferro-electric liquid crystal panel and is electrically controllable can be used as the spatial light modulator 33. A liquid crystal retarder having a switching speed of about 180 Hz may be available at a relatively low cost. When the spatial light modulator 33 includes a liquid crystal retarder, for example, the incident light is not delayed in the first status, the incident light is delayed by a phase of ¼ the wavelength ($\lambda/4$) in the second status, and the incident light is delayed by a phase of ½ the wavelength ($\lambda/4$) in the third status.

As illustrated in FIG. 5, the first birefringent element array 34 according to the present embodiment is formed by alternately arranging first and second vertical birefringent elements 34a and 34b along the horizontal direction. That is, the first and second vertical birefringent elements 34a and 34b are respectively formed lengthwise in the longitudinal direction of the autostereoscopic display apparatus 30 and alternately arranged along the horizontal direction.

Also, according to the present embodiment, the first birefringent element array 34 converts the polarization direction of the incident light such that the polarization directions of light passing through the first and second vertical birefringent elements 34a and 34b are perpendicular to each other. For example, each of the first and second vertical birefringent elements 34a and 34b can comprise a polarizer having a polarization plane in a predetermined direction. In this case, the polarization plane of a polarizer forming the first vertical birefringent element 34a and the polarization plane of a polarizer forming the second vertical birefringent element 34b are perpendicular to each other. Also, the first and second vertical birefringent elements 34a and 34b can comprise retarders that delay the incident light by a predetermined phase. In this case, the retarders forming the first vertical birefringent elements 34a and the retarders forming the second vertical birefringent element 34b are formed such that a phase delay difference therebetween is $\lambda/2$. For example, the first vertical birefringent element 34a does not delay the phase while the second vertical birefringent element 34b delays the phase by $\lambda/2$, or the first vertical birefringent element 34a delays the phase by $-\lambda/4$ while the second vertical birefringent element 34b delays the phase by $+\lambda/4$. Also, in another exemplary embodiment of the present invention, the first and second vertical birefringent elements 34a and 34b can comprise rotators that rotate the incident light by a predetermined angle. In this case, the rotator forming the first vertical birefringent element 34a and the rotator forming the second vertical birefringent element 34b are formed such that a rotation angle difference is 90°. For example, the first vertical birefringent element 34a does not rotate the incident light while the second vertical birefringent element 34b rotates the incident light by 90°, or the first vertical birefringent element 34a rotates the incident light by −45° while the second vertical birefringent element 34b rotates the incident light by +45°.

According to the present embodiment, the light passing through the spatial light modulator 33 and the first birefringent element array 34 may have one of the following polarization directions according to the status of the spatial light modulator 33. That is, first, the polarization direction of light passing through the first vertical birefringent element 34a may be perpendicular to the polarization direction of a polarizer 38a (refer to FIG. 6) on the incident side of the LCD panel 37 while the polarization direction of light passing through the second vertical birefringent element 34b is parallel to the polarization direction of the polarizer 38a on the incident side of the LCD panel 37. Second, the polarization direction of light passing through the first vertical birefringent element 34a may be parallel to the polarization direction of the polarizer 38a on the incident side of the LCD panel 37 while the polarization direction of light passing through the second vertical birefringent element 34b is perpendicular to the polarization direction of the polarizer 38a on the incident side of the LCD panel 37. Third, light passing through the first and second vertical birefringent elements 34a and 34b may be either circularly polarized or linearly polarized and inclined by 45° with respect to the polarization direction of the polarizer 38a on the incident side of the LCD panel 37.

The lenticular lens sheet 35 includes a plurality of vertical lenticular lens elements that are horizontally arranged. Thus, each vertical lenticular lens element is formed lengthwise in the vertical direction of the autostereoscopic display apparatus 30, parallel to the first and second vertical birefringent elements 34a and 34b of the first birefringent element array 34. The lenticular lens sheet 35 separates the incident light into left and right eye viewing zones. That is, according to the incident position of the incident light, the light passing through the lenticular lens sheet 35 is separated into the left and right eye viewing zones, at a viewing distance, and forms images. For example, the light emitted from the first vertical birefringent element 34a can be guided to the left eye viewing zone through the lenticular lens sheet 35 while the light emitted from the second vertical birefringent element 34b can be guided to the right eye viewing zone.

As it is well known in the art, the interval between the left and right eye viewing zones at a viewing distance may be about 65 mm. In the present embodiment, the pitch between the vertical lenticular lens elements of the lenticular lens sheet 35 may be the same as or less than the pitch between a pair of the first and second vertical birefringent elements 34a and 34b. That is, the width of one vertical lenticular lens element is the same as or slightly less than the sum of the widths of the first and second vertical birefringent elements 34a and 34b. Also, the distance between the lenticular lens sheet 35 and the first birefringent element array 34 is the same as or slightly greater than the focal length of the vertical lenticular lens element.

As illustrated in FIG. 5, the second birefringent element array 36 is arranged in front of the lenticular lens sheet 35. The second birefringent element array 36 according to the present embodiment includes the third and fourth horizontal birefringent elements 36a and 36b that are alternately arranged along the vertical direction of the autostereoscopic display apparatus 30. That is, the third and fourth horizontal birefringent elements 36a and 36b are formed lengthwise in the latitudinal direction of the autostereoscopic display apparatus 30 and alternately arranged along the vertical direction of the autostereoscopic display apparatus 30.

The second birefringent element array 36, like the first birefringent element array 35, changes the polarization direction of the incident light such that the polarization directions of the light passing through the third and fourth horizontal birefringent elements 36a and 36b are perpendicular to each other. For example, each of the third and fourth horizontal birefringent elements 36a and 36b may comprise a polarizer having a polarized plane in a predetermined direction. In this case, the polarized plane of the polarizer of the third horizontal birefringent element 36a is perpendicular to the polarized plane of the polarizer of the fourth birefringent element 36b. Also, the third and fourth horizontal birefringent elements 36a and 36b may be retarders that delay the incident light by a predetermined phase. In this case, the phase delay difference between the retarder forming the third horizontal birefringent element 36a and the retarder forming the fourth horizontal birefringent element 36b is $\lambda/2$. For example, the third horizontal birefringent element 36a does not delay the phase of the incident light while the fourth horizontal birefringent element 36b delays the phase of the incident light by $\lambda/2$, or the third horizontal birefringent element 36a delays the phase of the incident light by $-\lambda/4$ while the fourth horizontal birefringent element 36b delays the phase by $+\lambda/4$. Also, in another embodiment of the present invention, the third and fourth horizontal birefringent elements 36a and 36b can comprise rotators that rotate the incident light by a predetermined angle. In this case, the rotator forming the third horizontal birefringent element 36a and the rotator forming the fourth horizontal birefringent element 36b are formed such that a rotation angle difference is 90°. For example, the third horizontal birefringent element 36a does not rotate the incident light while the fourth horizontal birefringent element 36b rotates the incident light by 90°, or the third horizontal birefringent element 36a rotates the incident light by −45° while the fourth horizontal birefringent element 36b rotates the incident light by +45°.

According to the present embodiment, each of the third and fourth horizontal birefringent elements 36a and 36b of the second birefringent element array 36 corresponds to one of the pixel lines of the LCD panel 37. Thus, the number of third and fourth horizontal birefringent elements 36a and 36b of the second birefringent element array 36 is the same as of the number of pixel lines of the LCD panel 37. Also, the third and fourth horizontal birefringent elements 36a and 36b of the second birefringent element array 36 are arranged parallel to the pixel lines of the LCD panel 37.

Figure 6:
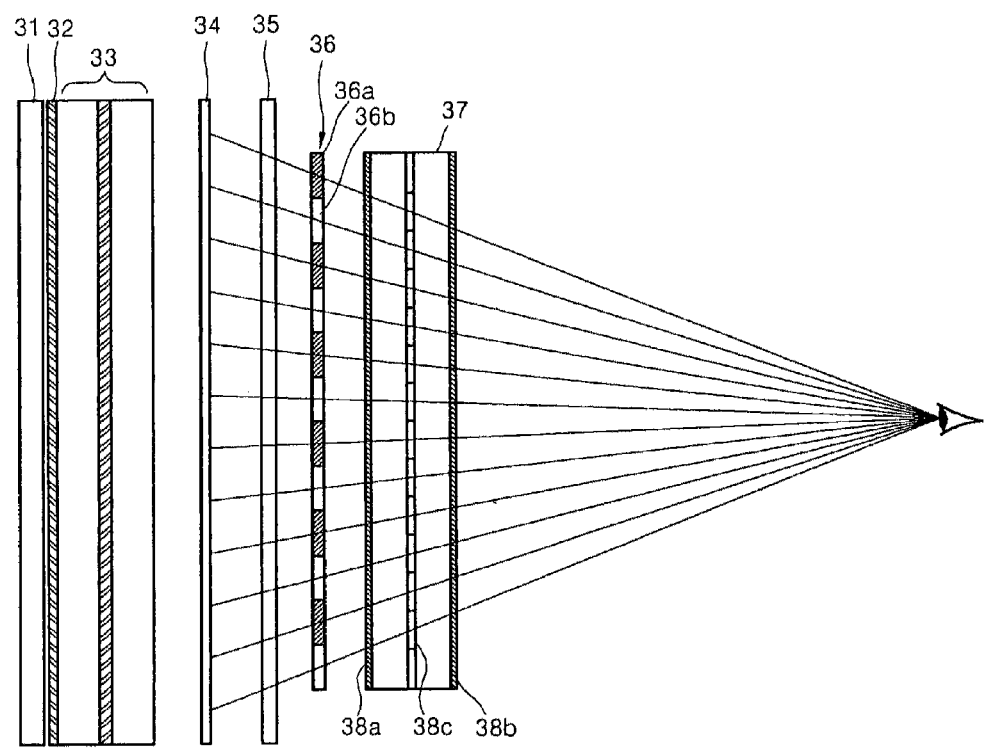
FIG. 6 is a cross-sectional view for explaining the relationship between the pitch of the second birefringent element array and the pixel pitch of a liquid crystal display (LCD) panel.

To prevent the generation of a Moire pattern on an image displayed on the LCD panel 37, the pitch of the third and fourth horizontal birefringent elements 36a and 36b of the second birefringent element array 36 may be slightly greater than that of the pixel lines of the LCD panel 37. FIG. 6 is a cross-sectional view for explaining the above relationship that illustrates the vertically crossed section of the autostereoscopic display apparatus 30 of FIG. 5. Referring to FIG. 6, the third and fourth horizontal birefringent elements 36a and 36b of the second birefringent element array 36 are arranged alternately in the vertical direction in the rear of the LCD panel 37 when viewed by a viewer. Also, a plurality of pixels 38c are arranged in 2-dimensions in the vertical and horizontal directions on the LCD panel 37. In FIG. 6, only the pixels 38c arranged in the vertical direction are illustrated. The eye of a viewer is positioned at a certain point in front of the LCD panel 37. Then, the third and fourth horizontal birefringent elements 36a and 36b, corresponding to the pixel lines of the LCD panel 37 located higher or lower than the position of the eye of the viewer, need to be arranged at positions higher or lower than the corresponding pixel lines as illustrated in FIG. 6. To this end, the pitch of the third and fourth horizontal birefringent elements 36a and 36b of the second birefringent element array 36 is slightly greater than the pitch of the pixel lines of the LCD panel 37. For example, when the pitch of the pixel lines of the LCD panel 37 is about 0.265 mm, the pitch of the third and fourth horizontal birefringent elements 36a and 36b of the second birefringent element array 36 is about 0.266 mm.

According to the present embodiment, there is no need to use a high speed response LCD having a refresh rate of about 120 Hz as the LCD panel 37 and the use of a related art LCD having a refresh rate of 60-75 Hz is sufficient. In the present embodiment, an interlaced method is used instead of the related art time-sharing method in which the images for left and right eyes are alternately displayed on the entire screen in a time-sequence manner. That is, according to the present embodiment, the LCD panel 37 displays images by interlacing the images for the left and right eyes. For example, in the first frame, the left eye image is displayed on odd pixel lines while the right eye image is displayed on even pixel lines. In the next frame, the right eye image is displayed on the odd pixel lines while the left eye image is displayed on the even pixel lines.

Referring to FIGS. 7 through 10, the operation of the high resolution autostereoscopic display apparatus 30 configured as above according to the present embodiment will be described in detail.

Figure 7:
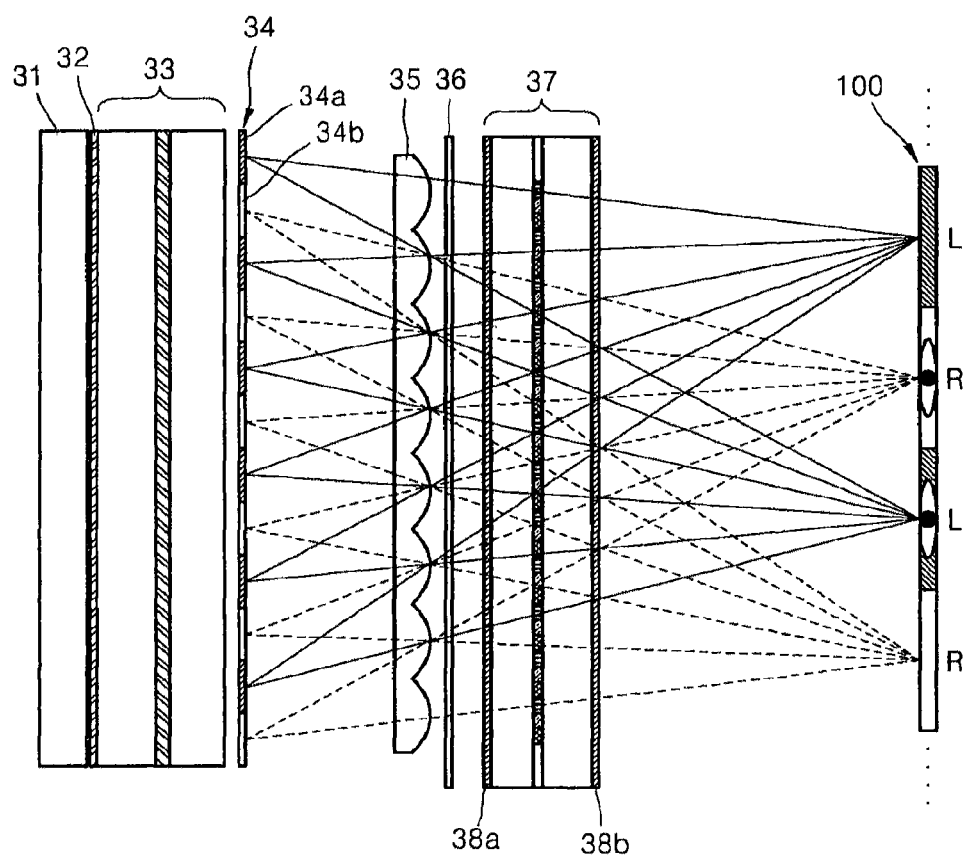
FIG. 7 is a cross-sectional view illustrating the operation of the high resolution autostereoscopic display apparatus according to an exemplary embodiment of the present invention.

FIG. 7 is a cross-sectional view illustrating the operation of the autostereoscopic display apparatus 30 of FIG. 5 in which the spatial light modulator 33 is in the first status. The polarizers 38a and 38b are attached to the incident side and the exit side of the LCD panel 37. For the convenience of the explanation, the polarizing plate 32 and the polarizer 38a at the incident side of the LCD panel 37 are assumed to have a horizontal polarization direction. Also, the spatial light modulator 33 is assumed to be a liquid crystal retarder having a first status in which the polarization direction of the incident light does not change, a second status in which the polarization direction of the incident light changes by 45°, and a third status in which the polarization direction of the incident light changes by 90°. It is assumed that the first vertical birefringent elements 34a of the first birefringent element array 34 do not delay the phase of light while the second vertical birefringent elements 34b of the first birefringent element array 34 delay the phase of light by half a wavelength ($\lambda/2$). Although it is not illustrated in detail in FIG. 7, the second birefringent element array 36 has third horizontal birefringent elements 36a at the odd rows and fourth horizontal birefringent elements 36b at the even rows. Like the first birefringent element array 34, it is assumed that the third horizontal birefringent elements 36a of the second birefringent element array 36 do not delay the phase of light while the fourth horizontal birefringent elements 36b of the second birefringent element array 36 delay the phase of light by half a wavelength ($\lambda/2$).

When the spatial light modulator 33 is in the first status, the polarization direction of light that passes through the polarizing plate 32 and is incident upon the spatial light modulator 33 does not change. Thus, the light passing through the spatial light modulator 33 has a horizontal polarization direction. Then, the light passes through the first and second vertical birefringent elements 34a and 34b. At this time, the light passing through the first vertical birefringent element 34a maintains the horizontal polarization direction while the polarization direction of light passing through the second vertical birefringent element 34b changes by 90° so as to have a vertical polarization direction. The light passing through the first and second vertical birefringent elements 34a and 34b is separated by the lenticular lens sheet 35 into the left and right eye zones L and R and guided by the lenticular lens sheet 35 towards the left and right eye zones. That is, the light passing through the first vertical birefringent element 34a proceeds towards the left eye zone L of a viewing zone 100 while the light passing through the second vertical birefringent element 34b proceeds towards the right eye zone R of the viewing zone 100.

Then, the light separated by the lenticular lens sheet 35 passes through the third and fourth horizontal birefringent elements 36a and 36b arranged along the vertical direction. In this process, of the light passing through the first vertical birefringent element 34a and proceeding towards the left eye viewing zone L of the viewing zone 100, the light passing through the third horizontal birefringent element 36a maintains the horizontal polarization direction while the polarization direction of light passing through the fourth horizontal birefringent element 36b changes by 90° so as to have a vertical polarization direction. Also, of the light passing through the second vertical birefringent element 34b and proceeding towards the right eye viewing zone R of the viewing zone 100, the light passing through the third horizontal birefringent element 36a maintains the vertical polarization direction while the polarization direction of light passing through the fourth horizontal birefringent element 36b changes by 90° so as to have a horizontal polarization direction. That is, of the light proceeding towards the left eye viewing zone L of the viewing zone 100, the light passing through the odd rows of the second birefringent element array 36 has a horizontal polarization direction while the light passing through the even rows of the second birefringent element array 36 has a vertical polarization direction. Also, of the light proceeding towards the right eye viewing zone R of the viewing zone 100, the light passing through the odd rows of the second birefringent element array 36 has a vertical polarization direction while the light passing through the even rows has a horizontal polarization direction.

The polarizer 38a at the incident side of the LCD panel 37 has a horizontal polarization direction. Thus, of the light proceeding towards the left eye viewing zone L of the viewing zone 100, the light passing through the odd rows of the second birefringent element array 36 passes through the polarizer 38a, but the light passing through the even rows of the second birefringent element array 36 does not pass through the polarizer 38a. Also, of the light proceeding towards the right eye viewing zone R of the viewing zone 100, the light passing through the odd rows of the second birefringent element array 36 does not pass through the polarizer 38a at the incident side of the LCD panel 37, but the light passing through the even rows of the second birefringent element array 36 passes through the polarizer 38a at the incident side of the LCD panel 37. As described above, the third and fourth horizontal birefringent elements 36a and 36b of the second birefringent element array 36 correspond to the pixel lines of the LCD panel 37. Thus, the image displayed from the odd rows of the pixel lines of the LCD panel 37 proceeds towards the left eye viewing zone L of the viewing zone 100 while the image displayed from the even rows of the pixel lines of the LCD panel 37 proceeds towards the right eye viewing zone R of the viewing zone 100. As a result, as illustrated in FIG. 8, the image of the odd rows of the pixel lines of the LCD panel 37 is recognized by the left eye while the image of the even rows of the pixel lines of the LCD panel 37 is recognized by the right eye.

Figure 9:
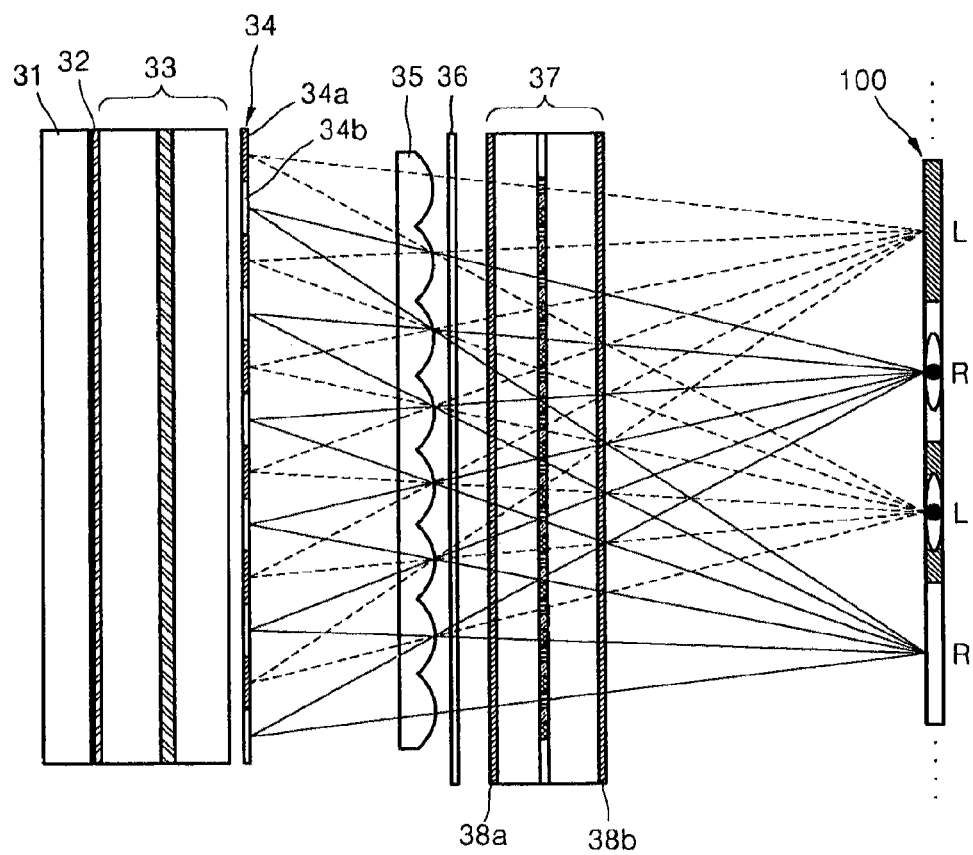
FIG. 9 illustrates a cross-sectional view of the operation of the autostereoscopic display apparatus according to an exemplary embodiment of the present invention.

Next, FIG. 9 illustrates a cross-sectional view of the operation of the autostereoscopic display apparatus 30 according to the present invention. Referring to FIG. 9, when the spatial light modulator 33 is in the third status, the polarization direction of light passing through the polarizing plate 32 and incident on the spatial light modulator 33 changes by 90°. Thus, the light passing through the spatial light modulator 33 has a vertical polarization direction. Then, the light passes through the first and second vertical birefringent elements 34a and 34b. At this point, the light passing through the first vertical birefringent elements 34a maintains the vertical polarization direction while the polarization direction of light passing through the second vertical birefringent elements 34b changes by 90° so as to have a horizontal polarization direction. Then, the light passing through the first and second vertical birefringent elements 34a and 34b are separated into the left and right eye viewing zones by the lenticular lens sheet 35 and guided by the lenticular lens sheet 35 towards the left and right eye viewing zones. That is, the light passing through the first vertical birefringent elements 34a proceeds to the left eye viewing zone L of the viewing zone 100 as directed by the lenticular lens sheet 35 and the light passing through the second vertical birefringent elements 34b proceeds to the right eye viewing zone R of the viewing zone 100 as directed by the lenticular lens sheet 35.

The light separated by the lenticular lens sheet 35 passes through the third and fourth horizontal birefringent elements 36a and 36b. In this process, of the light passing through the first vertical birefringent elements 34a and proceeding towards the left eye viewing zone L of the viewing zone 100, the light passing through the third horizontal birefringent element 36a maintains the vertical polarization direction while the polarization direction of light passing through the fourth horizontal birefringent elements 36b changes by 90° so as to have a horizontal polarization direction. Also, of the light passing through the second vertical birefringent elements 34b and proceeding towards the right eye viewing zone R of the viewing zone 100, the light passing through the third horizontal birefringent elements 36a maintains the horizontal polarization direction while the polarization direction of light passing through the fourth horizontal birefringent elements 36b changes by 90° so as to have a vertical polarization direction. That is, of the light proceeding towards the left eye viewing zone L of the viewing zone 100, the light passing through the odd rows of the second birefringent element array 36 has a vertical polarization direction while the light passing through the even rows of the second birefringent element array 36 has a horizontal polarization direction. Also, of the light proceeding towards the right eye viewing zone R of the viewing zone 100, the light passing through the odd rows of the second birefringent element array 36 has a horizontal polarization direction while the light passing through the even rows of the second birefringent element array 36 has a vertical polarization direction.

The polarizer 38a at the incident side of the LCD panel 37 has a horizontal polarization direction. Thus, of the light proceeding towards the left eye viewing zone L of the viewing zone 100, the light passing through the odd rows of the second birefringent element array 36 does not pass through the polarizer 38a at the incident side of the LCD panel 37, while only the light passing through the even rows of the second birefringent element array 36 can pass through the polarizer 38a at the incident side of the LCD panel 37. Also, of the light proceeding towards the right eye viewing zone R of the viewing zone 100, the light passing through the odd rows of the second birefringent element array 36 can pass through the polarizer 38a at the incident side of the LCD panel 37, but the light passing through the even rows of the second birefringent element array 36 cannot pass through the polarizer 38a at the incident side of the LCD panel 37. As a result, the image displayed from the odd rows of the pixel lines of the LCD panel 37 proceeds towards the right eye viewing zone R of the viewing zone 100 while the image displayed from the even rows of the pixel lines of the LCD panel 37 proceeds towards the left eye viewing zone L of the viewing zone 100. Thus, as illustrated in FIG. 10, the image of the odd pixel lines of the LCD panel 37 is recognized by the right eye while the image of the even pixel lines of the LCD panel 37 is recognized by the left eye.

According to the above principle, while the LCD panel 37 displays the left eye image in the odd pixel lines and the right eye image in the even pixel lines, the spatial light modulator 33 switches to the first status. In the next frame, while the LCD panel 37 displays the right eye image in the odd pixel lines and the left eye image in the even pixel lines, the spatial light modulator 33 switches to the third status. Thus, the spatial light modulator 33, the first birefringent element array 34, and the second birefringent element array 36 together control the polarization direction such that the light proceeding towards the left eye viewing zone L of the viewing zone 100 is incident on the pixel lines of the LCD panel 37 where the left eye image is displayed and the light proceeding towards the right eye viewing zone R of the viewing zone 100 is incident on the pixel lines of the LCD panel 37 where the right eye image is displayed. Thus, it can be seen that the spatial light modulator 33, the first birefringent element array 34, and the second birefringent element array 36 together constitute a single polarization switch.

According to the display operation according to the present embodiment an image is displayed by scanning twice, that is, once for odd rows and once for even rows. In this way, an image can be displayed without decreasing resolution and simultaneously preventing flickering at a relatively slow scanning speed of 25 Hz (PAL) or 30 Hz (NTSC). In the present embodiment, as the left eye image and the right eye image are displayed by interlacing the pixel lines of the respective left and right eye images sequentially, the flickering and decrease of resolution are hardly noticeable when the related art LCD panel 37 having a vertical scanning speed, that is, a refresh rate, of 60-75 Hz, is used.

In the autostereoscopic display apparatus 30 according to the present embodiment, a 2-dimensional image mode (2D mode) can be embodied in a number of ways. For example, the spatial light modulator 33 may be repeatedly switched between the first and third statuses so that the LCD panel 37 displays the same 2D image continuously twice. In this way, the odd rows of the same 2D image are recognized by the left eye and the even rows of the same 2D image are recognized by the right eye. Then, the even rows of the same 2D image are recognized by the left eye and the odd rows of the same 2D image are recognized by the right eye. Thus, a viewer can sense a 2D image.

In another method, the spatial light modulator 33 is maintained in the second status and the LCD panel 37 displays a 2D image frame by frame in a conventional manner. When the spatial light modulator 33 is in the second status, the polarization direction of light passing through the polarizing plate 32 and incident on the spatial light modulator 33 changes by 45°. Thus, the light passing through the spatial light modulator 33 has a polarization direction of 45°, that is, in a diagonal direction. Then, the light continuously passes through the first and second vertical birefringent elements 34a and 34b and the third and fourth horizontal birefringent elements 36a and 36b. The first through fourth birefringent elements 34a, 34b, 36a, and 36b do not change the polarization direction of the incident light or change the polarization direction of the incident light by 90°. As a result, the light passes through the LCD panel 37 and forms an image in both of the left and right viewing zones L and R of the viewing zone 100. Thus, when the LCD panel 37 displays a 2D image, a user can view the 2D image through the left and right eyes.

Also, when the spatial light modulator 33 is in the second status, instead of changing the polarization direction of the incident light by 45°, the polarization state of the incident light can be changed so that the exit light becomes circularly polarized light. For example, the spatial light modulator 33 does not change the polarization direction of the incident light in the first status, however, it changes the polarization direction of the incident light by 90° in the third status, and changes the incident light to circularly polarized light in the second status. When the incident light changes to circularly polarized light in the second status, the same result as the case in which the polarization direction of the incident light changes by 45° can be obtained.

However, as described above, a display panel sequentially displays continuous images of a frame from the top of a screen to the bottom of the screen, rather than displaying a single frame image over the entire screen and then the next single frame image over the entire screen. Thus, cross talk can occur as the left eye image and the right eye image are mixed while the image of two frames shares a screen. To prevent this problem, the autostereoscopic display apparatus 30 according to the present embodiment, as illustrated in FIG. 5, uses the backlight unit 31 and the spatial light modulator 33 which are divided into N-segments. That is, the backlight unit 31 and the spatial light modulator 33 are divided into a plurality of horizontal segments that are sequentially switched in synchronization with the vertical scanning time of the LCD panel 37. The horizontal segments of the backlight unit 31 and spatial light modulator 33 can be independently switched and are arranged along the vertical direction.

According to the present embodiment, the number of horizontal segments of the backlight unit 31 and of the spatial light modulator 33 can be appropriately chosen according to the design. To completely remove cross talk, a horizontal segment of the backlight unit 31 and of the spatial light modulator 33 may correspond to a pixel line of the LCD panel 37. In this case, however, manufacturing costs are high. Thus, the horizontal segments of each of the backlight unit 31 and of the spatial light modulator 33 may instead correspond to the number of pixel lines of the LCD panel 37. For example, a horizontal segment of the backlight unit 31 and a horizontal segment of the spatial light modulator 33 may correspond to 100 pixel lines of the LCD panel 37. The number of horizontal segments of the backlight unit 31 may be the same as that of the spatial light modulator 33.

Figure 11:
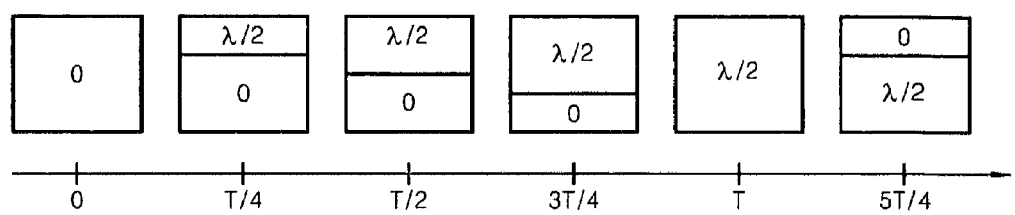
FIG. 11 illustrates the switching operation of a spatial light modulator divided into a plurality of segments according to time.

In this structure, the horizontal segments of the backlight unit 31 and of the spatial light modulator 33 corresponding each other can be simultaneously switched. That is, the respective horizontal segments of the backlight unit 31 are turned on and off in synchronization with the scanning time of the corresponding pixel lines of the LCD panel 37. Also, each horizontal segment of the spatial light modulator 33, for example, switches to the first status when the pixel lines of the LCD panel 37 corresponding thereto display an image of a frame and to the third status when the image of the next frame is displayed. FIG. 11 illustrates the switching operation of the spatial light modulator 33. In FIG. 11, the spatial light modulator 33 is a four-division spatial light modulator that is divided into four segments and a liquid crystal retarder that does not delay the incident light in the first status and delays the phase of the incident light by ½ a wavelength (λ/2) in the third status. As illustrated in FIG. 11, the spatial light modulator 33 is entirely in the first status at time "0" and entirely in the third status at time "T". The spatial light modulator 33 continuously changes from the first status to the third status between the time 0 and the time T in synchronization with the LCD panel 37. The switching operation of the spatial light modulator 33 is controlled in order to be accurately synchronized with the time when the LCD panel 37 displays the image of each frame. As a result, cross talk hardly occurs during the time when the images of two frames share the screen and the left eye image and the right eye image can be accurately separated.

Figure 12:
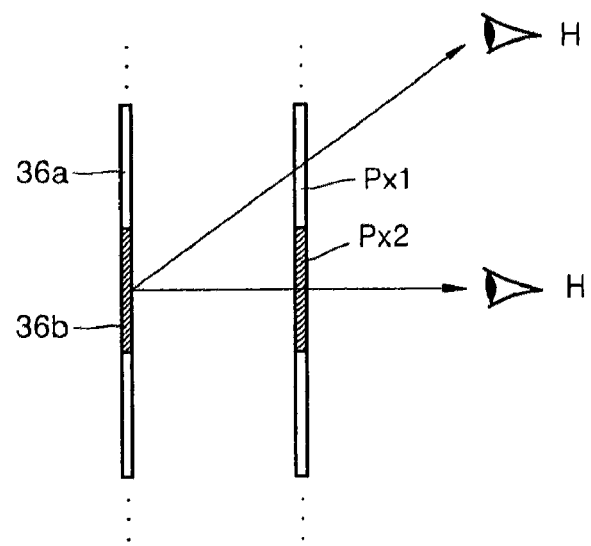
FIG. 12 is a cross-sectional view for explaining the reasons for the generation of cross talk according to the viewing height of a viewer.

However, according to the present embodiment, cross talk in which the left and right eye images are mixed or reversed may occur according to the height of the eyes of the viewer. FIG. 12 is a cross-sectional view for explaining the reason for the generation of cross talk according to the viewing height of a viewer. Referring to FIG. 12, when a viewer views an image at a normal height H, the third horizontal birefringent element 36a and the fourth horizontal birefringent element 36b accurately correspond to a first pixel Px1 and a second pixel Px2, respectively. However, when the viewer views the image at a height H' that is higher than the normal height H, it seems as if the first pixel Px1 corresponds to the fourth horizontal birefringent device 36b. In this case, the viewer sees an autostereoscopic image in which the left and right images are reversed and at a height between the height H and height H', the viewer sees an image in which the left and right images are not clearly separated.

Figure 13:
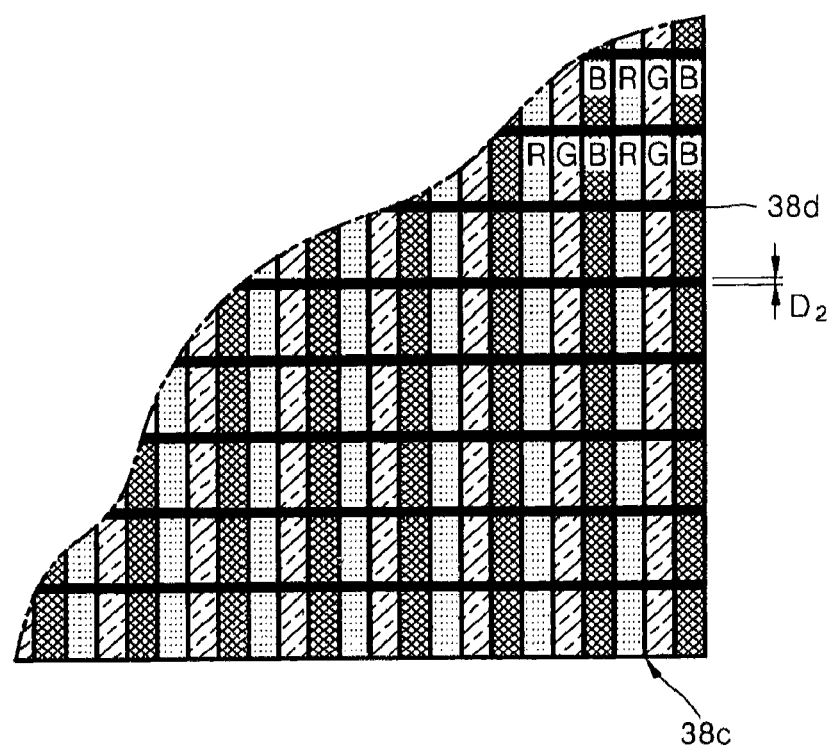
FIG. 13 schematically illustrates the structure of a pixel in the conventional LCD panel.
Figure 14:
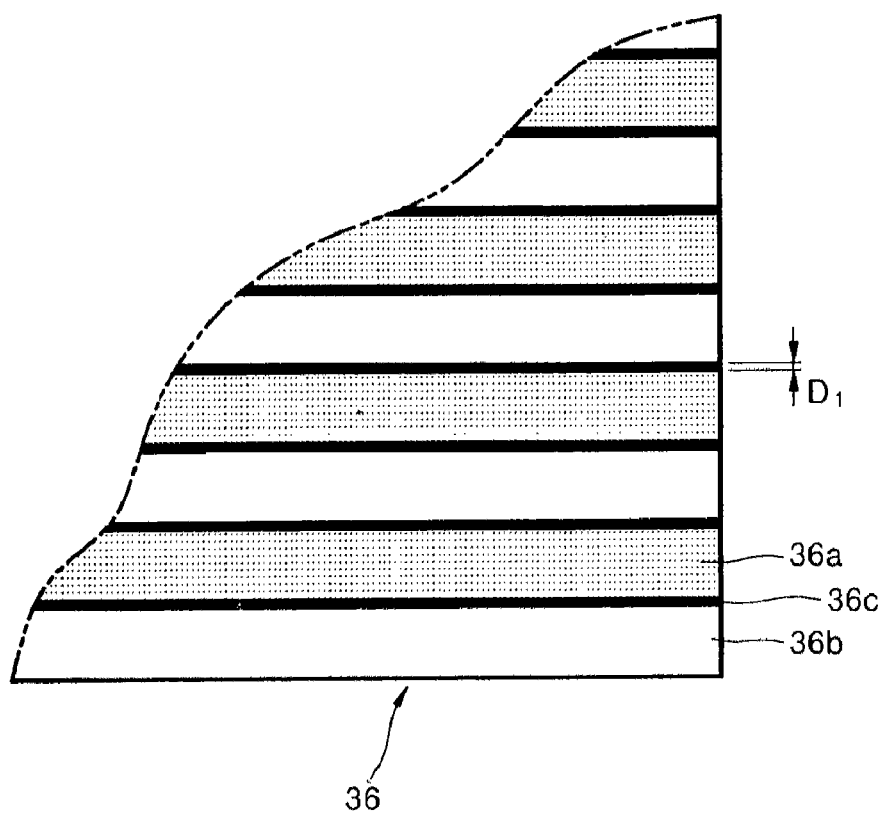
FIG. 14 schematically illustrates the improved structure of a second birefringent device array according to an exemplary embodiment of the present invention.

Thus, to more comfortably view the autostereoscopic image, the height range in which the left and right images are clearly separate should be increased. To achieve this, as illustrated in FIG. 13, a black matrix 38d existing between the pixels 38c of the LCD panel 37 is used. In general, the black matrix 38d having a width $D_2$ in the vertical direction is formed between the pixels 38c of the LCD panel 37 in order to separate the pixels 38c of the LCD panel 37. In the second birefringent element array 36 according to the present embodiment, as illustrated in FIG. 14, an opaque mask 36c having a strip shape corresponding to the black matrix 38d of the LCD panel 37 is horizontally arranged between the third and fourth horizontal birefringent elements 36a and 36b. The width of the opaque mask 36c in the vertical direction is indicated by $D_1$.

Figure 15:
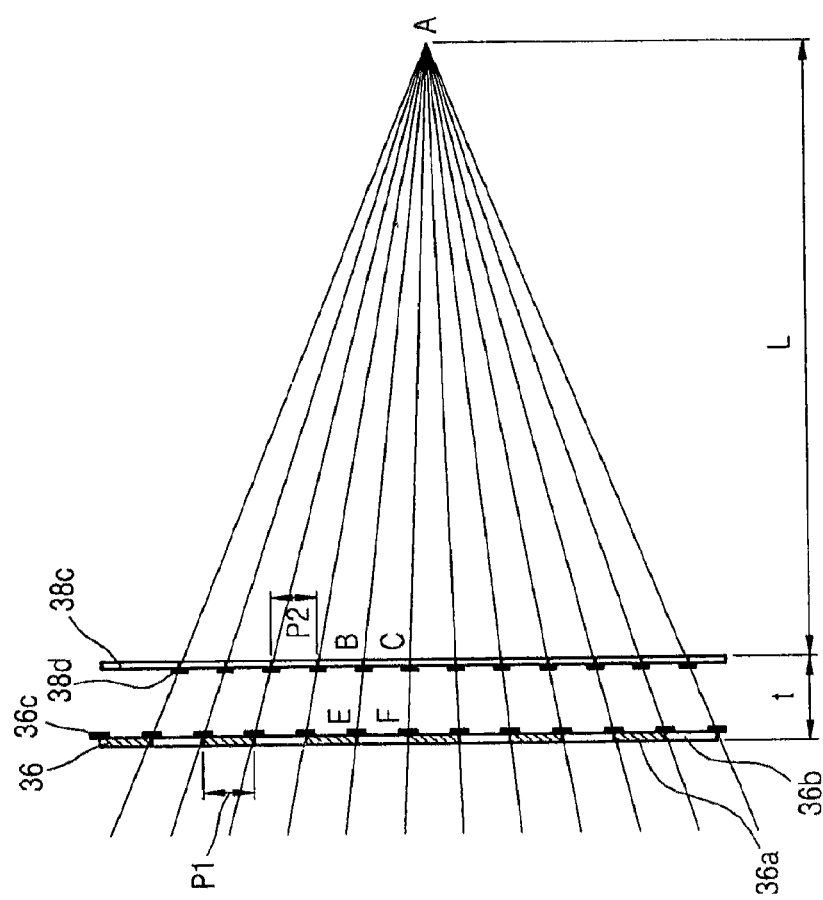
FIGS. 15 and 16 are cross-sectional views for explaining the relationship between the pixel pitch of the second birefringent device array and the LCD panel and the height of an area where cross talk is not generated.
Figure 16:
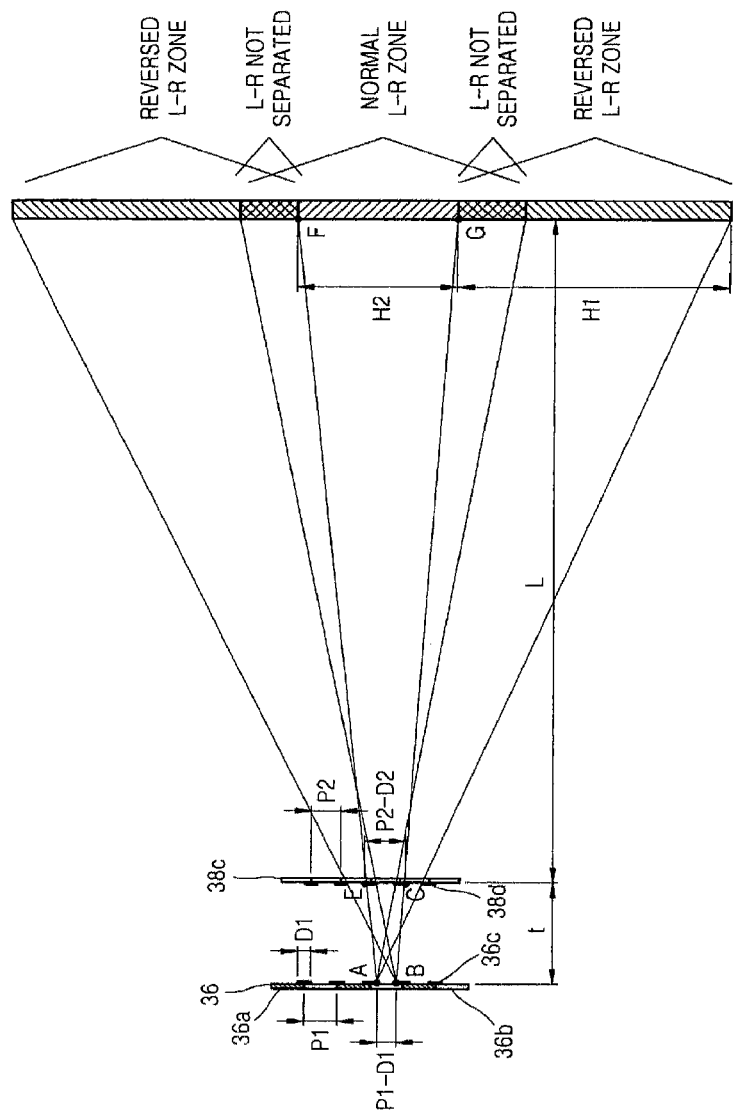

Referring to FIGS. 15 and 16, the effects of the opaque mask 36c of the second birefringent element array 36 and the black matrix 38d of the LCD panel 37 on a height range in which the left and right images are clearly separated will be described. In FIG. 15 and FIG. 16, the pitch of the second birefringent element array 36 is P1, the pitch of the pixel 38c of the LCD panel 37 is P2, the range of height at which the left and right images are clearly separate is H2, the range of height at which the left and right images are reversed is H1, the distance between the second birefringent element array 36 and the pixel 38c of the LCD panel 37 is t, and the viewing distance from the pixel 38c of the LCD panel 37 to a viewer is L. Then, the following Equation 1 can be obtained from triangles AEF and ABC in FIG. 15.

$$\frac{P_2}{L} = \frac{P_1}{L+t}$$ [Equation 1]

The following Equation 2 can be obtained from trapezoids CEFG, and ABFG and the following Equation 3 can be obtained from trapezoids CEFG and ABCE.

$$\frac{t}{L} = \frac{P_2 + D_2}{H_2}$$ [Equation 2]

$$\frac{t}{L} = \frac{P_1 - D_1}{P_2 + D_2}$$ [Equation 3]

Then, the following Equation 4 can be obtained from Equations 1 through 3.

$$H2=(L/t)(D_1+D_2+(t/L)D_2)$$ [Equation 4]

Here, since t<<L, the term "(t/L)D$_2$" can be ignored. Accordingly, the following Equation 5 can be finally obtained.

$$H2=(L/t)(D_1+D_2)$$ [Equation 5]

In Equation 5, as the widths $D_1$ and $D_2$ of the opaque mask 36c of the second birefringent element array 36 and the black matrix 38d of the LCD panel 37 increase, the range H2 of the height at which the left and right images are clearly separate can be increased. Thus, according to the present embodiment, to increase the range H2 of a height at which the left and right images are clearly separated, the width of the opaque mask 36c is maximized within a range in which reduction of the brightness of a displayed image is minimized. By doing so, the range H2 of a height at which the left and right images are clearly separate can be increased to about 150-200 mm.

Figure 17:
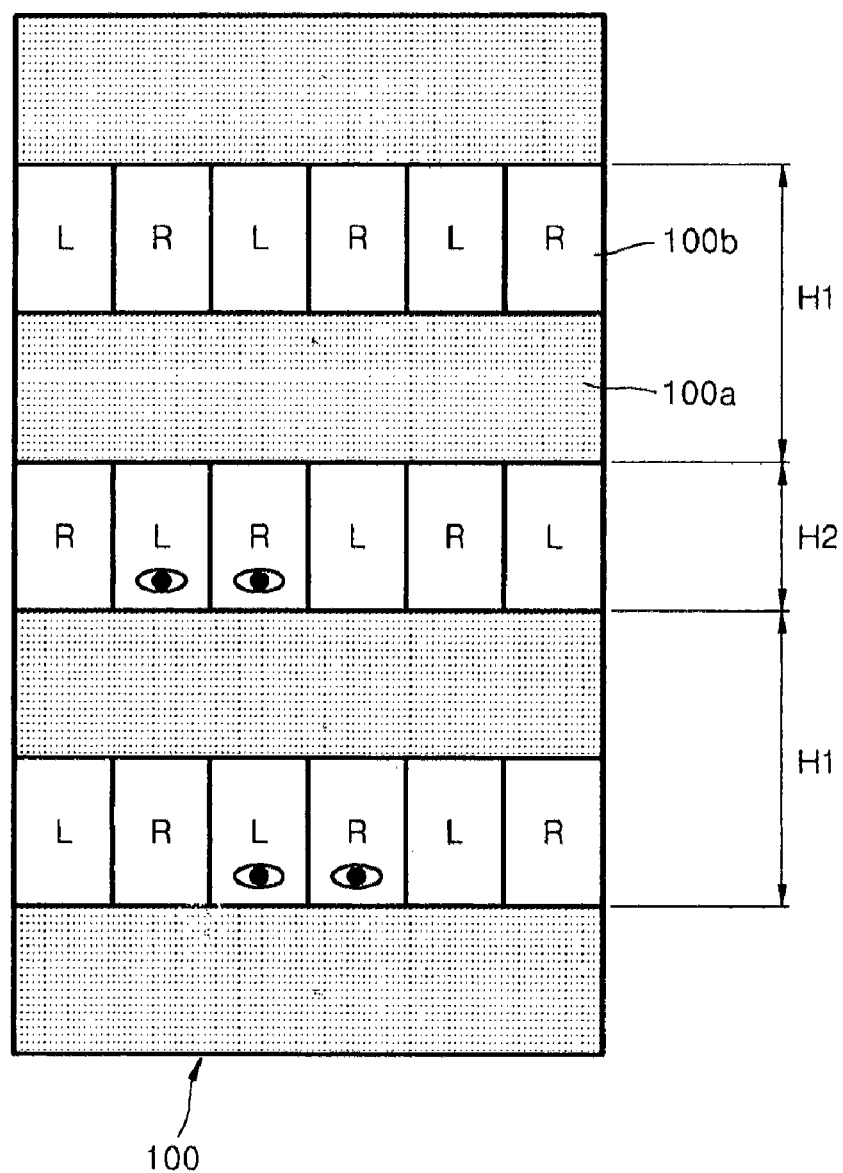
FIG. 17 schematically illustrates the structure of a viewing zone formed by the autostereoscopic display apparatus according to an exemplary embodiment of the present invention.

FIG. 17 illustrates the structure of the viewing zone 100 formed by the autostereoscopic display apparatus 30 according to the present invention. As illustrated in FIG. 17, in the range H2, a clearly separate autostereoscopic image can be viewed; in the range H1, an area 100a, the left and right images are not clearly separate; and an area 100b the left and right images are reversed.

Figure 18:
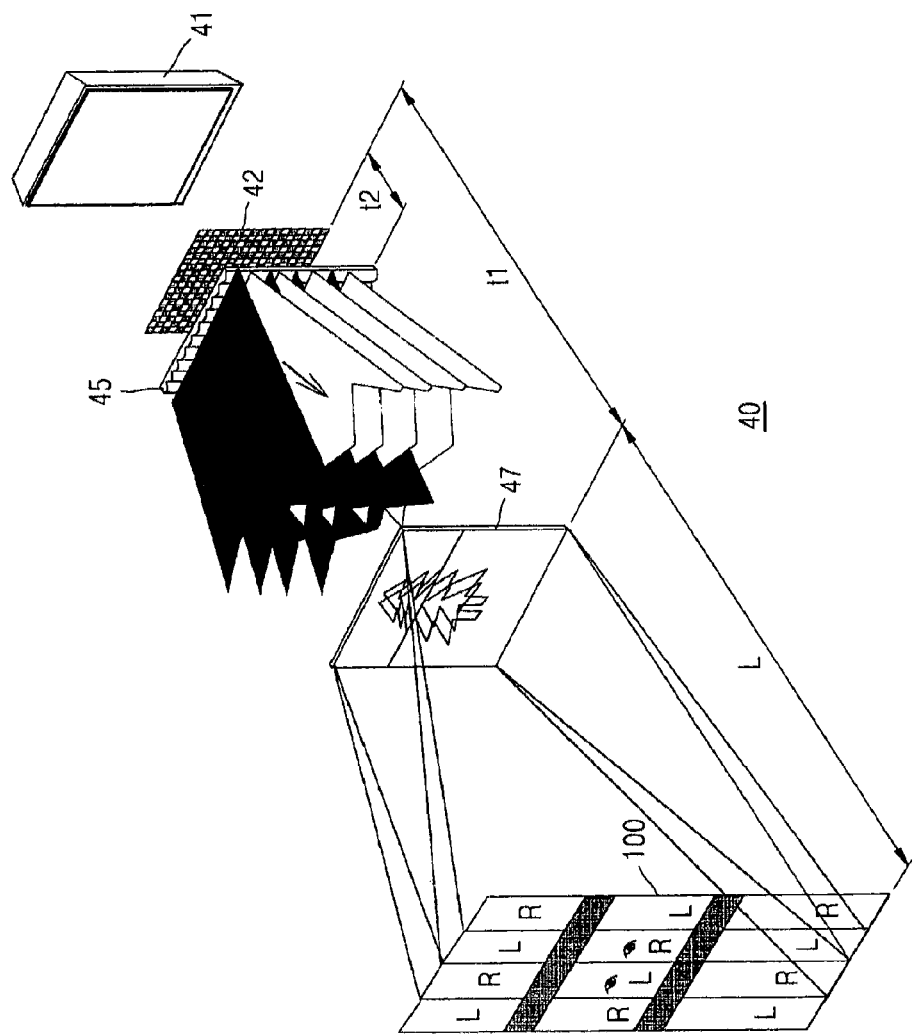
FIG. 18 is an exploded perspective view schematically showing the structure of a high resolution autostereoscopic display apparatus according to another exemplary embodiment of the present invention.

FIG. 18 is an exploded perspective view schematically illustrating the structure of a high resolution autostereoscopic display apparatus 40 according to another exemplary embodiment of the present invention. Referring to FIG. 18, the high resolution autostereoscopic display apparatus 40 according to another exemplary embodiment of the present invention includes a backlight unit 41, a spatial light modulator 42 that switches between a transparent state and an opaque state according to electric control, a lenticular lens sheet 45 separating the incident light into the left eye viewing zone L and the right eye viewing zone R, and a LCD panel 47 displaying an image.

According to the present embodiment, the backlight unit 41 does not need to be a division type and a related art backlight unit can be used. However, as illustrated in FIG. 5, the division type backlight unit 31 can be used as the backlight unit 41. Also, the LCD panel 47, like the embodiment illustrated in FIG. 5, displays an image according to the interlaced method instead of a time-sharing type method. That is, the LCD panel 37 displays the left and right eye images by interlacing the left and right eye images. For example, in the first frame, the left eye image is displayed in the odd pixel lines and the right eye image is displayed in the even pixel lines. In the next frame, the right eye image is displayed in the odd pixel lines and the left eye image is displayed in the even pixel lines.

The spatial light modulator 42 includes a plurality of cells that are arranged in two dimensions along rows and columns and are independently controllable. The number of rows of the spatial light modulator 42, that is, the number of cells in the vertical direction, may be the same as the number of pixel lines of the LCD panel 47. According to the present embodiment, the spatial light modulator 42 can be switched between three statuses. That is, the spatial light modulator 42 switches between the first status in which all cells of the spatial light modulator 42 are transparent, the second status in which the transparent cells and opaque cells are arranged in a checkered pattern, and the third status, which is complementary to the second status, in which the transparent cells in the second status become opaque and the opaque cells in the second status become transparent. Also, according to the present embodiment, the spatial light modulator 42 can be switched at a high speed between the second and third statuses sequentially line by line in synchronization with the vertical scanning time of the LCD panel 47. To this end, the spatial light modulator 42 can use a structure in which, for example, an optical compensation bend (OCB) twist nematic (TN) liquid crystal panel or a ferro-electric liquid crystal (FELC) panel is arranged between two polarizers. Since a polarizer is arranged on the incident surface of the LCD panel 47, the spatial light modulator 42 according to the present embodiment can comprise a polarizer and a liquid crystal panel.

Figure 19:
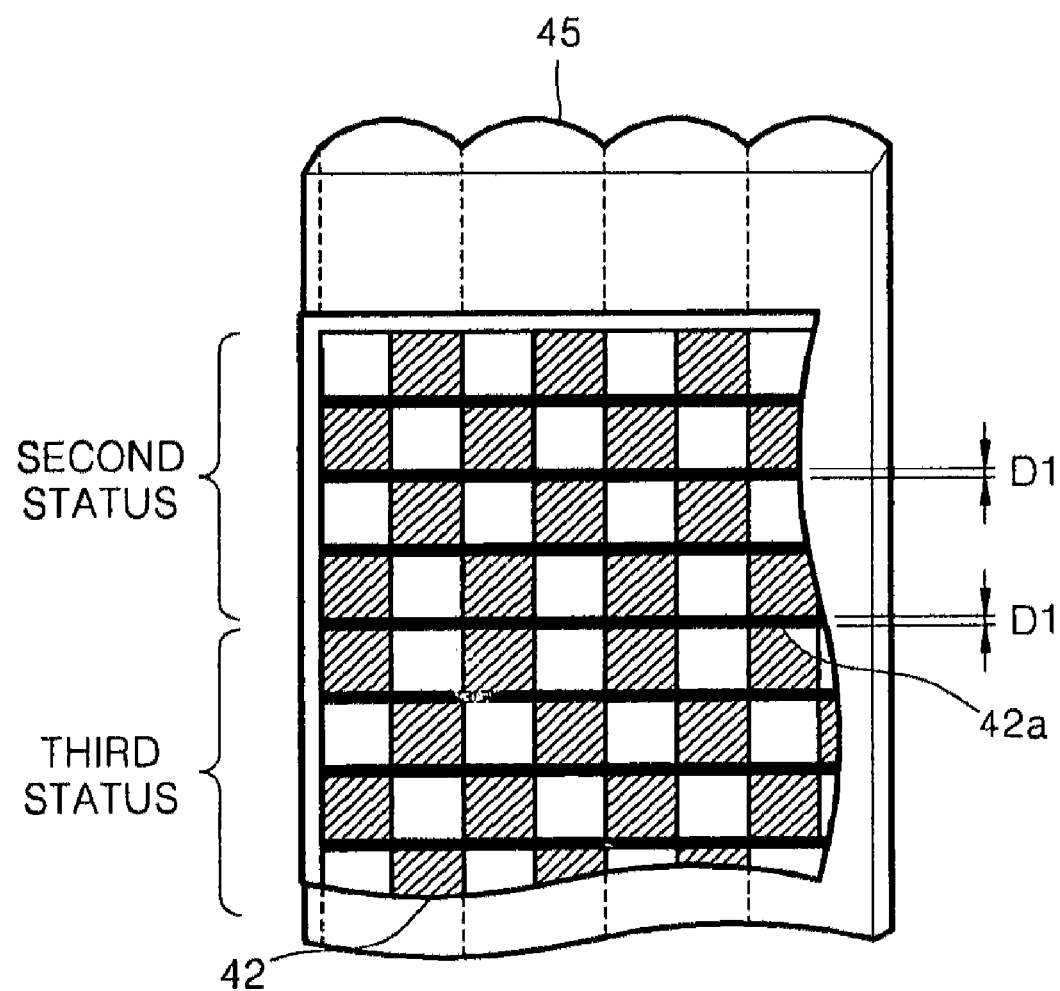
FIG. 19 illustrates in detail the relative arrangement of a spatial light modulator and a lenticular lens sheet of the high resolution autostereoscopic display apparatus illustrated in FIG. 18, according to an exemplary embodiment of the present invention.

FIG. 19 illustrates in detail the relative arrangement of the spatial light modulator 42 and the lenticular lens sheet 45 of the high resolution autostereoscopic display apparatus 40 illustrated in FIG. 18, according to an exemplary embodiment of the present invention. Referring to FIG. 19, the lenticular lens sheet 45 is arranged to face and be parallel to the spatial light modulator 42. The lenticular lens sheet 45 is arranged such that a lens element of the lenticular lens sheet 45 corresponds to two columns of the spatial light modulator 42. In order for the left eye viewing zone L and right eye viewing zone R of the viewing zone 100 to be clearly separate at the viewing distance, the pitch between the lens elements of the lenticular lens sheet 45 is equal to, or slightly greater than twice pitch between the columns of the spatial light modulator 42. Also, the distance t2 between the lenticular lens sheet 45 and the spatial light modulator 42 is the same as or slightly greater than the focal length of the lenticular lens element of the lenticular lens sheet 45.

In the present embodiment, cross talk in which the left and right images are mixed or reversed according to the viewing height of a viewer may occur for the same reason as explained above with reference to FIG. 12. Thus, to increase the range of height at which the left and right images are accurately separated, as illustrated in FIG. 19, an opaque mask 42a having a striped shape and a width $D_1$ is arranged in the horizontal direction between the rows of the respective cells of the spatial light modulator 42. At this point, for the same reason as explained with reference to FIG. 6, the pitch in the vertical direction between the opaque masks 42a in the horizontal direction of the spatial light modulator 42 may be slightly greater than the pitch between the pixel lines of the LCD panel 47.

As in the description with reference to FIGS. 15 and 16 and assuming that the width of the opaque mask 42a of the spatial light modulator 42 is $D_1$, the width of the black matrix between the pixels of the LCD panel 47 is $D_2$, the distance between the black matrix of the LCD panel 47 and the opaque mask 42a of the spatial light modulator 42 is t1, and the viewing distance from the LCD panel 47 is L, the height H2 of the viewing zone where no cross talk occurs satisfies an equation where H2=L($D_1$+$D_2$)/t1. Thus, since the loss of light increases as the widths of the black matrix and the opaque mask 42a increase, the distance t1 between the black matrix and the opaque mask 42a is set to be as short as possible.

In general, the distance t1 between the black matrix and the opaque mask 42a can be a sum of the optical thicknesses (i.e. physical thickness/refractive index) of a substrate of the spatial light modulator 42, a substrate of the LCD panel 47, and the lenticular lens sheet 45. For example, when the thickness of the substrate of the spatial light modulator 42 is 0.7 mm, the thickness of the lenticular lens sheet 45 is 0.2 mm, the thickness of the substrate of the LCD panel 47 is 0.7 mm, the thickness of the polarizer is 0.2 mm, and the average refractive index n of the above devices is 1.5, the distance t1 between the black matrix and the opaque mask 42a is t1= (0.7+0.7+0.2+0.2)/1.5=1.2 mm. Also, for example, when the width of the opaque mask 42a $D_1$ is 0.1 mm, the width $D_2$ of the black matrix is 0.05 mm, and the viewing distance L from the LCD panel 47 is 700 mm, the height H2 of a viewing zone having no cross talk is H2=700 mm(0.1+0.05)/1.2=87.5 mm.

The operation of the autostereoscopic display apparatus 40 according to the present embodiment will be described below with reference to FIGS. 18 and 19.

According to the present embodiment, as illustrated in FIG. 19, each lens element of the lenticular lens sheet 45 corresponds to two columns of the spatial light modulator 42. Thus, when viewing in a direction in which the light proceeds, the light passing through the odd columns of the spatial light modulator 42 is always deflected to the right and proceeds towards the left eye of the viewer. In contrast, the light passing through the even columns of the spatial light modulator 42 is always deflected to the left by the lenticular lens sheet 45 and proceeds towards the right eye of the viewer.

For example, when the spatial light modulator 42 is in the second status and viewing in the direction in which the light proceeds, it is assumed that in the odd rows of the spatial light modulator 42, the odd columns of the spatial light modulator 42 are transparent and the even columns of the spatial light modulator 42 are opaque and, in the even rows of the spatial light modulator 42, the odd columns of the spatial light modulator 42 are opaque and the even columns of the spatial light modulator 42 are transparent (see the upper portion of the spatial light modulator 42 of FIG. 19). In this case, since only the odd columns of the spatial light modulator 42 transmit light in the odd rows of the spatial light modulator 42, the light passing through the odd rows of the spatial light modulator 42 proceeds towards the left eye of the viewer. In contrast, since only the even columns of the spatial light modulator 42 transmit the light in the even rows of the spatial light modulator 42, the light passing through the even rows of the spatial light modulator 42 proceeds towards the right eye of the viewer. Thus, a portion of the LCD panel 47 corresponding to a portion in the second status of the spatial light modulator 42 displays the left eye image in the odd pixel lines and the right eye image in the even pixel lines.

Also, when the spatial light modulator 42 is in the third status and viewed from the direction in which the light proceeds, it is assumed that in the odd rows of the spatial light modulator 42, the odd columns of the spatial light modulator 42 are opaque and the even columns of the spatial light modulator 42 are transparent and in the even rows of the spatial light modulator 42, the odd columns of the spatial light modulator 42 are transparent and the even columns of the spatial light modulator 42 are opaque (see the lower portion of the spatial light modulator 42 of FIG. 19). In this case, since only the even columns of the spatial light modulator 42 transmit light in the odd rows of the spatial light modulator 42, the light passing through the odd rows of the spatial light modulator 42 proceeds towards the right eye of the viewer. In contrast, since only the odd columns of the spatial light modulator 42 transmit the light in the even row of the spatial light modulator 42, the light passing through the even rows of the spatial light modulator 42 proceeds towards the left eye of the viewer. Thus, a portion of the LCD panel 47 corresponding to a portion in the third status of the spatial light modulator 42 displays the right eye image in the odd pixel lines and the left eye image in the even pixel lines.

Thus, for example, when the LCD panel 47 displays the left eye image in the odd pixel lines and the right eye image in the even pixel lines in the first frame and the right eye image in the odd pixel lines and the left eye image in the even pixel lines in the second frame, the spatial light modulator 42 switches to the second status when the LCD panel 47 displays the first frame and to the third status when the LCD panel 47 displays the second frame. As described above, since the spatial light modulator 42 according to the present embodiment switches between the second and third statuses sequentially line by line in synchronization with the vertical scanning time of the LCD panel 47, cross talk does not occur during when the LCD panel 47 displays the first and second frames at the same time. Also, since the LCD panel 47 displays the image according to the interlaced method, the decrease in the resolution and the generation of flickering can be minimized.

In the autostereoscopic display apparatus 40 according to the present embodiment, the 2-dimensional image mode (2D mode) can be embodied in a number of ways. For example, the spatial light modulator 42 switches between the second and third statuses and the LCD panel 47 and continuously displays the same 2D image twice. Then, the odd rows of the same 2D image are recognized by the left eye and the even rows of the same 2D image are recognized by the right eye. Next, the even rows of the same 2D image are recognized by the left eye and the odd rows of the same 2D image are recognized by the right eye. Thus, a viewer can sense a 2D image. In another way, while the spatial light modulator 42 is maintained in the first status in which all cells are transparent, the LCD panel 47 displays a 2D image in a conventional method.

Figure 20:
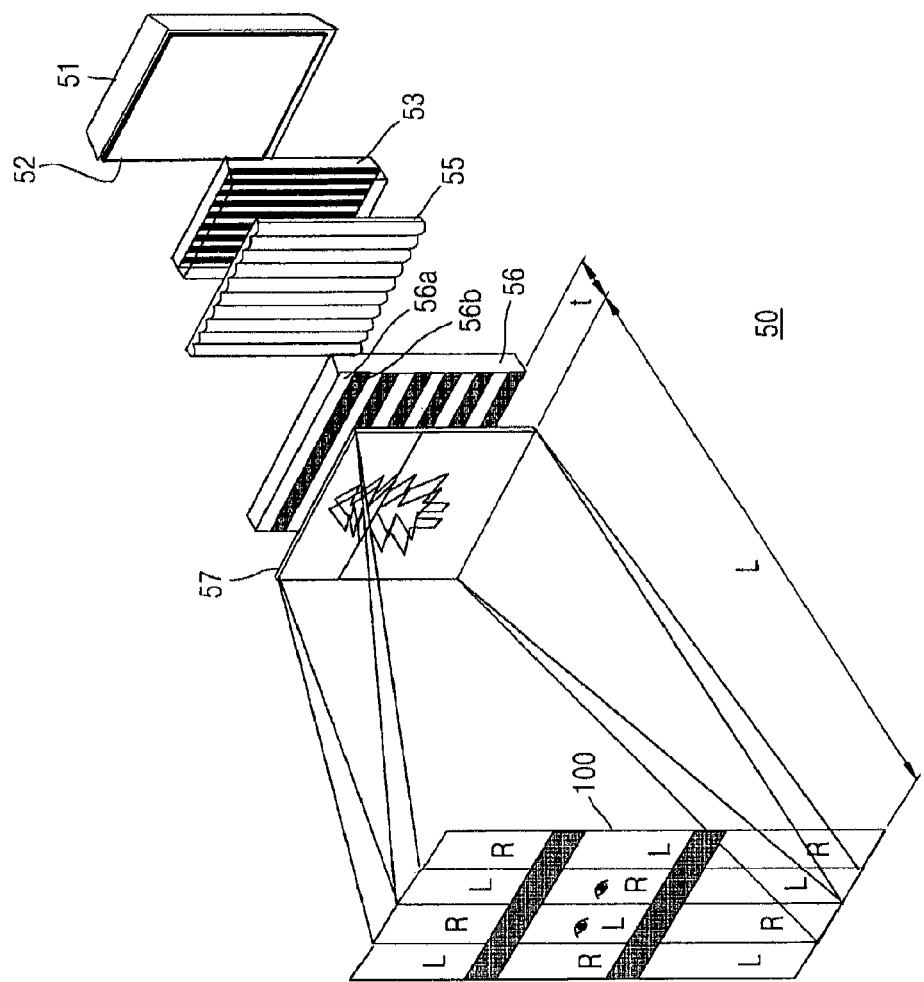
FIG. 20 is an exploded perspective view schematically illustrating the structure of a high resolution autostereoscopic display apparatus according to another exemplary embodiment of the present invention.

FIG. 20 is an exploded perspective view schematically illustrating the structure of a high resolution autostereoscopic display apparatus 50 according to another exemplary embodiment of the present invention. Referring to FIG. 20, the high resolution autostereoscopic display apparatus 50 according to the present embodiment includes a backlight unit 51, a polarizing plate 52 transmitting light having a particular polarization direction of light emitted from the backlight unit 51, a spatial light modulator 53 changing the polarization direction of incident light according to electric control, a lenticular lens sheet 55 separating the incident light into the left eye viewing zone L and the right eye viewing zone R, a birefringent element array 56 in which a plurality of first and second horizontal birefringent elements 56a and 56b are alternately arranged in the vertical direction, and an LCD panel 57 displaying an image.

According to the present embodiment, the backlight unit 51 does not need to be a division type and a related art backlight unit can be used. However, like the embodiment illustrated in FIG. 5, a division type backlight unit 51 can be used.

Also, the LCD panel 57, as the embodiment illustrated in FIG. 4, displays an image according to the interlaced method instead of the time-sharing type method. That is, the LCD panel 57 displays the left and right eye images by interlacing the left and right eye images. For example, in the first frame, the left eye image is displayed from the odd pixel lines and the right eye image is displayed from the even pixel lines. In the next frame, the right eye image is displayed from the odd pixel lines and the left eye image is displayed from the even pixel lines.

The spatial light modulator 53 includes a plurality of vertical columns that are independently controllable. According to the present embodiment, the spatial light modulator 53 can switch between two statuses. That is, the spatial light modulator 53 switches between the first status in which the odd vertical columns (hereinafter, referred to as the odd columns) do not change the polarization direction of the incident light and the even vertical columns (hereinafter, referred to as the even columns) change the polarization direction of the incident light by +90° or −90° and the second status in which the odd columns change the polarization direction of the incident light by +90° or −90° and the even columns do not change the polarization direction of the incident light. For example, in the first status, the odd columns of the spatial light modulator 53 do not delay a phase of light while the even columns delay a phase of light by +½ wavelength, or by −½ wavelength. In the second status, the odd columns delay a phase of light by +½ wavelength, or by −½ wavelength while the even columns of the spatial light modulator 53 do not delay the phase of light. Also, in the present embodiment, the spatial light modulator 53 can be switched at a high speed between the first and second statuses sequentially line by line in synchronization with the vertical scanning time of the LCD panel 57.

Figure 22:
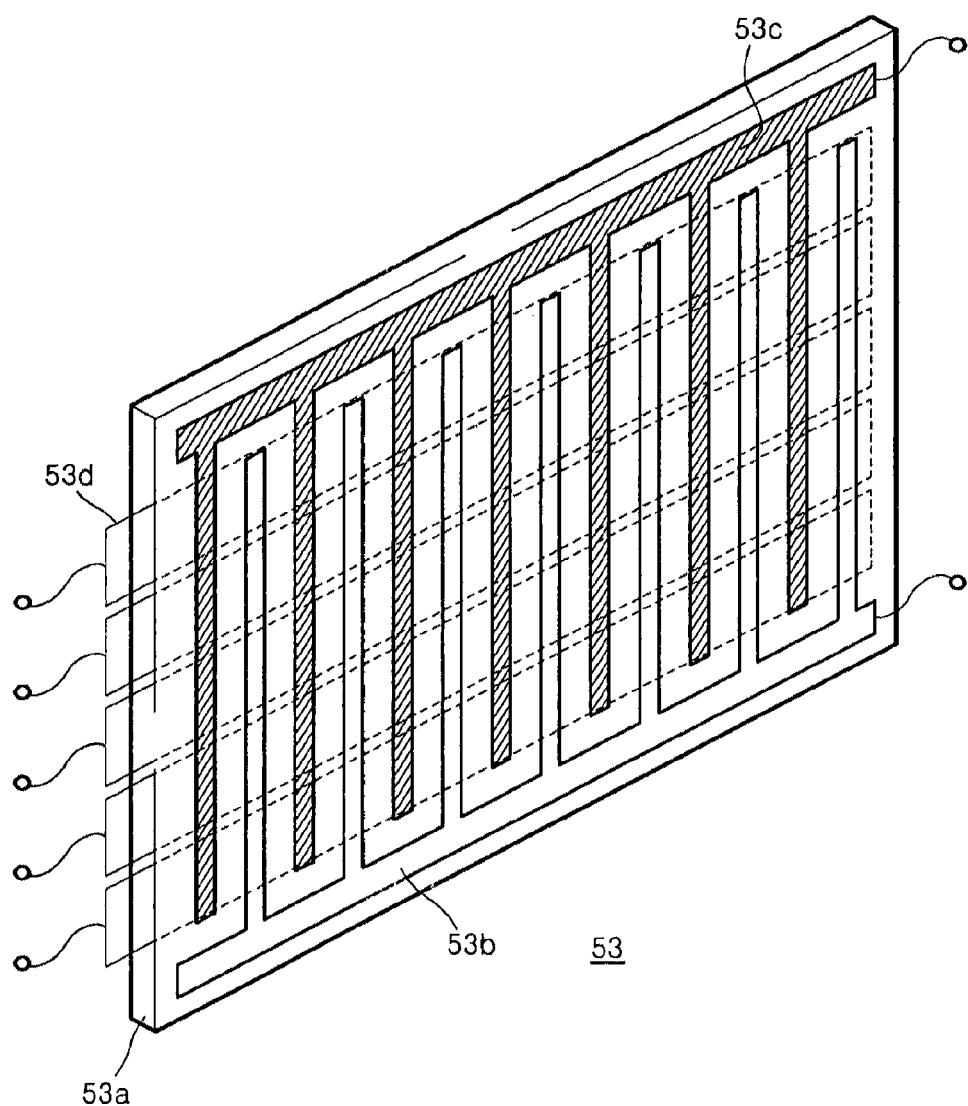
FIG. 22 illustrates in detail the structure of the spatial light modulator of the high resolution autostereoscopic display apparatus illustrated in FIG. 20, according to an exemplary embodiment of the present invention; and, FIG. 23 illustrates the operation of the autostereoscopic display apparatus illustrated in FIG. 20.

FIG. 22 illustrates in detail the structure of the spatial light modulator 53 of the high resolution autostereoscopic display apparatus 50 illustrated in FIG. 20, according to an exemplary embodiment of the present invention. Referring to FIG. 22, the spatial light modulator 53 may be a liquid crystal panel including a liquid crystal layer 53a of an OCB TN type or FELC type, an even column electrode 53b and an odd column electrode 53c arranged in the vertical direction on the front surface of the liquid crystal layer 53a in an inter-digit method, and a common electrode 53d arranged on the rear surface of the liquid crystal layer 53a. The even column electrode 53b and odd column electrode 53c are electrically independent from each other. Thus, the spatial light modulator 53 is driven such that a voltage is not applied to the odd column electrode 53c while the voltage is applied to the even column electrode 53b, or contrarily the voltage is not applied to the even column electrode 53d while the voltage is applied to the odd column electrode 53c. As illustrated in FIG. 22, the common electrode 53d is divided into a plurality of horizontal segments so that the spatial light modulator 53 is sequentially switched in synchronization with the vertical scanning time of the LCD panel 57. The horizontal segments of the common electrode 53d may be electrically independent of one another. Thus, the driving voltage can be sequentially applied to each of the horizontal segments of the common electrode 53d according to the vertical scanning time of the LCD panel 57. Since the spatial light modulator 53 can be operated by including the separate plurality of horizontal segments, for example, the spatial light modulator 53 switches such that the upper portion of the spatial light modulator 53 can switch to the first status and the lower portion of the spatial light modulator 53 can switch to the second status.

As described with reference to FIG. 19, according to the present embodiment, the lenticular lens sheet 55 faces the spatial light modulator 53 and is parallel to the spatial light modulator 53. The lenticular lens sheet 55 is arranged such that each lens element of the lenticular lens sheet 55 corresponds to two columns of the spatial light modulator 53. To accurately separate the left eye viewing zone L and the right eye viewing zone R, the pitch between the lens elements of the lenticular lens sheet 44 is the same as or slightly less than twice of the pitch of the columns of the spatial light modulator 53. That is, the width of one vertical lenticular lens element is the same as or slightly less than the width of two columns of the spatial light modulator 53. Also, the distance between the lenticular lens sheet 55 and the spatial light modulator 53 is the same as or slightly greater than the focal length of the vertical lenticular lens element.

Figure 21:
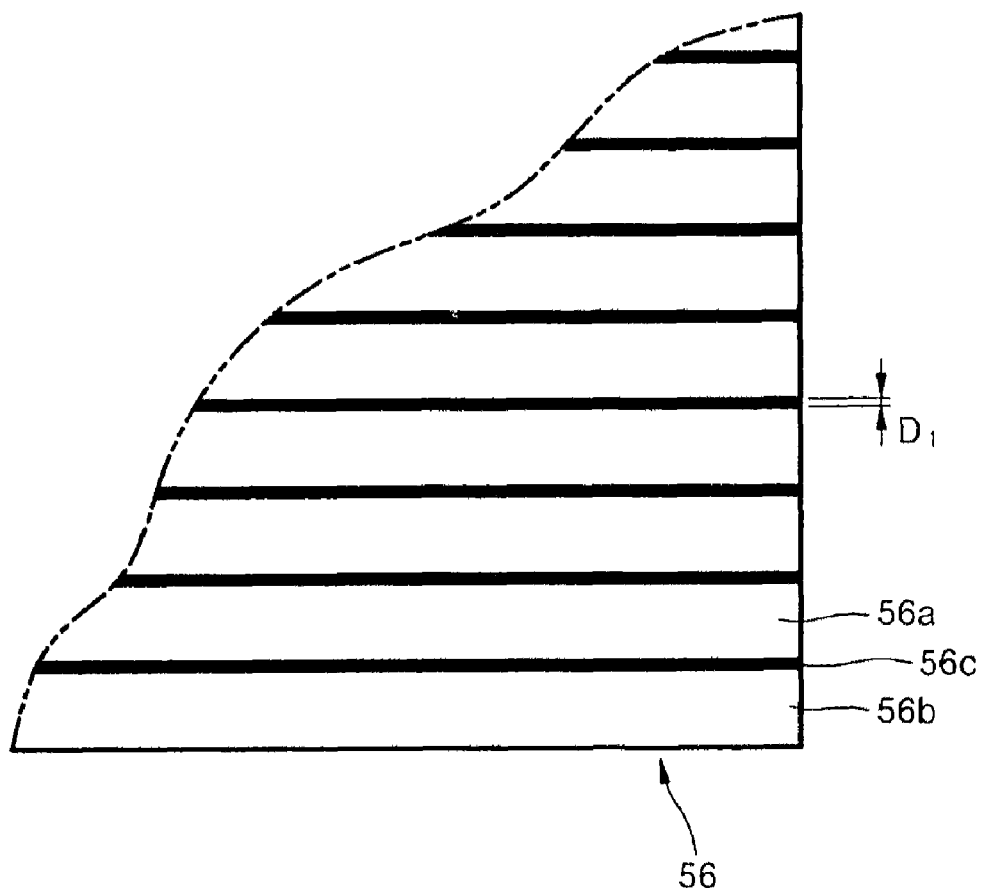
FIG. 21 schematically illustrates the structure of the birefringent device array of the high resolution autostereoscopic display apparatus illustrated in FIG. 20, according to an exemplary embodiment of the present invention.

FIG. 21 schematically illustrates the structure of the birefringent element array 56 of the high resolution autostereoscopic display apparatus 50 illustrated in FIG. 20, according to an exemplary embodiment of the present invention. Referring to FIG. 21, the birefringent element array 56 includes the plurality of first and second horizontal birefringent elements 56a and 56b that are alternately arranged in the vertical direction. The first and second birefringent elements 56a and 56b are formed to change the polarization direction of the incident light such that the polarization directions of light passing through the first and second birefringent elements 56a and 56b are perpendicular to each other. For example, the first birefringent elements 56a do not delay a phase of the light and the second birefringent elements 56b may be retarders that delay the phase of the light by −½ wavelength or by +½ wavelength. To increase the range of a height at which the left and right images are accurately separated, the birefringent element array 56 further includes an opaque mask 56c in a striped shape having a width $D_1$ and arranged in the horizontal direction between the first and second birefringent elements 56a and 56b.

According to the present embodiment, the first and second birefringent elements 56a and 56b of the birefringent element array 56 correspond to the pixel lines of the LCD panel 57. Thus, the number of first and second birefringent elements 56a and 56b of the birefringent element array 56 is the same as that of the pixel lines of the LCD panel 57. As in the description with reference to FIG. 6, in order to prevent the generation of the Moire pattern that is displayed on the LCD panel 57, the pitch of the first and second birefringent elements 56a and 56b of the birefringent element array 56 may be slightly greater than that of the pixel lines of the LCD panel 57.

The birefringent element array 56 can be a thin film type. Thus, the birefringent element array 56 of a film type can be directly attached to the polarizer at the incident side of the LCD panel 57. In this case, the distance t between the black matrix in the LCD panel 57 and the opaque mask 56c of the birefringent element array 56 is very short. Then, the height H2 of the viewing zone having no cross talk can be greatly increased.

Figure 23:
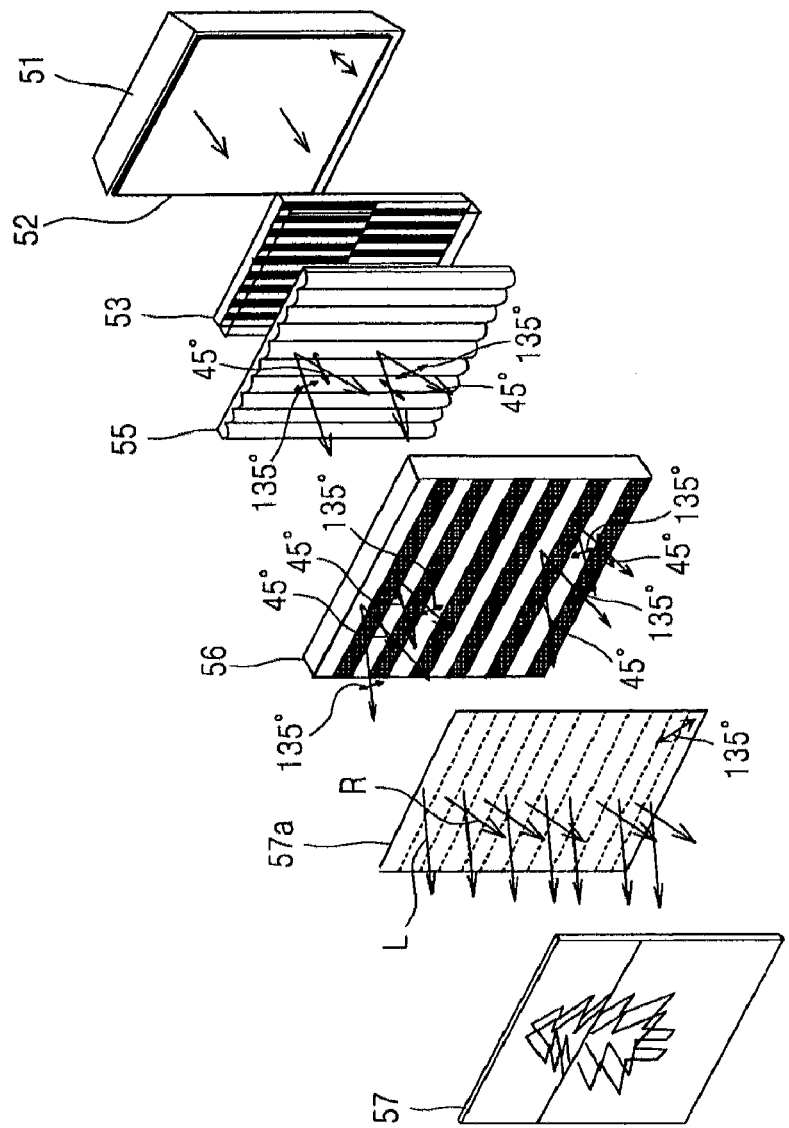

FIG. 23 shows the operation of the autostereoscopic display apparatus 50 illustrated in FIG. 20, according to an exemplary embodiment of the present invention. For the convenience of the explanation, it is assumed that the polarizing plate 52 has a polarization direction of 45° and a polarizer 57*a* at the incident side of the LCD panel 57 has a polarization direction of 135°. Also, it is assumed that, at a certain point, the upper portion of the LCD panel 57 displays the left eye image in the odd pixel liens and the right eye image in the even pixel lines. In contrast, the lower portion of the LCD panel 57 displays the right eye image in the odd pixel lines and the left eye image in the even pixel lines. At the same point, in synchronization with the LCD panel 57, the upper portion of the spatial light modulator 53 is in the second status in which the odd columns change the polarization direction of the incident light by +90° and the even columns do not change the polarization direction of the incident light, when viewed in the direction in which the light proceeds. Meanwhile, the lower portion of the spatial light modulator 53 is in the first status in which the even columns change the polarization direction of the incident light by +90° and the odd columns dodoes not change the polarization direction of the incident light. It is assumed that the first birefringent elements 56*a* of the birefringent element array 56 do not change the polarization direction of the incident light and the second birefringent elements 56*b* change the polarization direction of the incident light by +90°.

First, the light proceeding towards the upper portion of the LCD panel 57 will be described. Referring to FIG. 23, the light emitted from the backlight unit 51 proceeds to the polarizing plate 52 in order to have a polarization direction of 45°. Since the upper portion of the spatial light modulator 53 is in the second status when viewed in the direction in which the light proceeds, the light passing through the odd columns of the upper portion of the spatial light modulator 53 has a polarization direction of 135° and the light passing through the even columns of the upper portion of the spatial light modulator 53 has a polarization direction of 45°. Since each lens element of the lenticular lens sheet 55 corresponds to two columns of the spatial light modulator 53, the light passing through the odd columns of the spatial light modulator 53 is always deflected to the right by the lenticular lens sheet 55 in order to proceed towards the left eye of the viewer. In contrast, the light passing through the even columns of the spatial light modulator 53 is always deflected to the left by the lenticular lens sheet 55 in order to proceed towards the right eye of the viewer. Thus, the light passing through the lenticular lens sheet 55 and proceeding towards the left eye of the viewer has a polarization direction of 135° and the light proceeding towards the right eye of the viewer has a polarization direction of 45°.

Then, part of the light passes through the first birefringent elements 56*a* of the birefringent element array 56 and the other part of the light passes through the second birefringent elements 56*b* of the birefringent element array 56. Since the first birefringent elements 56*a* allow the light to pass as the light is, the light passing through the first birefringent elements 56*a* of the birefringent element array 56 and proceeding towards the left eye of the viewer has a polarization direction of 135° and the light proceeding towards the right eye of the viewer has a polarization direction of 45°. In contrast, since the second birefringent elements 56*b* of the birefringent element array 56 change the polarization direction of the incident light by +90°, the light passing through the second birefringent elements 56*b* of the birefringent element array 56 and proceeding towards the left eye of the viewer has a polarization direction of 45° and the light proceeding towards the right eye of the viewer has a polarization direction of 135°.

The light passing through the birefringent element array 56 is incident on the polarizer 57*a* at the incident side of the LCD panel 57. However, since the polarizer 57*a* at the incident side of the LCD panel 57 has a polarization direction of 135°, only the light passing through the first birefringent elements 56*a* of the birefringent element array 56 and proceeding towards the left eye of the viewer can pass through the polarizer 57*a*. In contrast, of the light passing through the second birefringent device 56*b* of the LCD panel 57, the light proceeding towards the right eye of the viewer can only pass through the polarizer 57*a*. As a result, of the light passing through the polarizer 57*a*, the light proceeding towards the left eye of the viewer is incident on the odd pixel lines of the LCD panel 57 and the light proceeding towards the right eye of the viewer is incident on the even pixel lines of the LCD panel 57. As described above, the upper portion of the LCD panel 57 displays the left eye image in the odd pixel lines and the right eye image in the even pixel lines. Thus, the left eye image can proceed towards the left eye of the viewer and the right eye image proceeds towards the right eye of the viewer.

The above description describes the light proceeding towards the upper portion of the LCD panel 57. The light proceeding towards the lower portion of the LCD panel 57 can be described with the same principles as described above. In such a case, since the lower portion of the spatial light modulator 53 is in the first status when viewed in the direction in which the light proceeds, the light passing through the odd columns of the lower portion of the spatial light modulator 53 has a polarization direction of 45° and the light passing through the even columns of the spatial light modulator 53 has a polarization direction of 135°. As a result, among the light passing through the polarizer 57*a*, the light proceeding towards the left eye of the viewer is incident on the even pixel lines of the LCD panel 57 and the light proceeding towards the right eye of the viewer is incident on the odd pixel lines of the LCD panel 57. As described above, the lower portion of the LCD panel 57 displays the right eye image in the odd pixel lines and the left eye image in the even pixel lines. Thus, the left eye image can proceed towards the left eye of the viewer and the right eye image proceeds towards the right eye of the viewer.

Thus, the spatial light modulator 53 and the birefringent element array 56 together control the light proceeding towards the left eye viewing zone to be incident on the pixel lines of the display panel 57 displaying the left eye image and the light proceeding towards the right eye viewing zone to be incident on the pixel lines of the display panel 57 displaying the right eye image. Thus, the spatial light modulator 33 and the birefringent element array 56 together constitute a polarization switch.

As described above, according to the present invention, a spatial light modulator such as a liquid crystal retarder that has a fast switching time and is relatively inexpensive is used. Thus, an autostereoscopic display apparatus according to the present invention has a simple structure and is relatively inexpensive.

Also, according to the present invention, since each of the backlight unit and the spatial light modulator is divided into a plurality of segments and each of the segments is operated in synchronization with the vertical scanning time of the LCD panel, cross talk of the left and right images hardly occurs.

Furthermore, according to the present invention, since the display panel displays the left and right images by interlacing the left and right images, even when a related art display panel having a relatively slow refresh rate is used, a decrease in the resolution and flickering of the left and right images hardly occurs.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An autostereoscopic display apparatus comprising:
a backlight unit;
a polarizing plate disposed in front of the backlight unit;
a display panel which displays a left eye image and a right eye image by interlacing pixel lines of the left and right eye images alternately and sequentially;
a lenticular lens sheet, disposed between the polarizing plate and the display panel, which separates light emitted from the backlight unit into a left eye viewing zone and a right eye viewing zone; and
a spatial light modulator disposed between the polarizing plate and the lenticular lens sheet and which switches between first, second, and third statuses in which the polarization direction of incident light changes;
a first birefringent element array, disposed between the spatial light modulator and the lenticular lens sheet, comprising a plurality of first and second vertical birefringent elements that alternate in the horizontal direction; and
a second birefringent element array disposed between the lenticular lens sheet and the display panel, comprising a plurality of third and fourth horizontal birefringent elements that alternate in the vertical direction.

2. The apparatus of claim 1, wherein:
the first birefringent element array changes the polarization direction of incident light so that the polarization direction of light passing through the first birefringent elements is perpendicular to the polarization direction of light passing through the second birefringent elements; and
the second birefringent element array changes the polarization direction of incident light so that the polarization direction of light passing through the third birefringent elements is perpendicular to the polarization direction of light passing through the fourth birefringent elements.

3. The apparatus of claim 2, wherein the third and fourth birefringent elements of the second birefringent element array each correspond to one of the pixel lines of the display panel.

4. The apparatus of claim 2, wherein, the second birefringent element array further comprises an opaque mask having a striped shape disposed between the third and fourth birefringent elements.

5. The apparatus of claim 4, further comprising a black matrix disposed between pixels of the display panel, wherein a width of the black matrix is D2, a width of the opaque mask is D1, a distance between the pixels of the display panel and the second birefringent element array is t, a viewing distance from the display panel is L, and a height H2 of a viewing zone having no cross talk satisfies an equation where $H2=(L/t)(D_1+D_2)$.

6. The apparatus of claim 2, wherein a pitch in a vertical direction between the third and fourth birefringent elements of the second birefringent element array, is greater than a pitch in the vertical direction between pixel lines of the display panel.

7. The apparatus of claim 2, wherein each of the first, second, third, and fourth birefringent elements comprises a polarizer having a predetermined polarization plane such that the polarization plane of the polarizers of the first birefringent elements are perpendicular to the polarization plane of the polarizers of the second birefringent elements, and the polarization plane of the polarizers of the third birefringent elements are perpendicular to the polarization plane of the polarizers of the fourth birefringent elements.

8. The apparatus of claim 2, wherein each of the first, second, third, and fourth birefringent elements comprises a retarder that delays the incident light by a predetermined phase, wherein a phase delay difference between the retarders of the first and second birefringent elements is $\lambda/2$, and a phase delay difference between the retarders of the third and fourth birefringent elements is $\lambda/2$.

9. The apparatus of claim 2, wherein each of the first, second, third, and fourth birefringent elements comprises a rotator that rotates the incident light by a predetermined angle, wherein a rotation angle difference between the rotators of the first and second birefringent elements is 90°, and a rotation angle difference between the rotators of the third and fourth birefringent elements is 90°.

10. The apparatus of claim 2, wherein the spatial light modulator switches between the first status in which the polarization direction of the incident light is not changed, the second status in which the polarization state of the incident light is changed to circularly polarized light, and the third status in which the polarization direction of the incident light is changed by 90°.

11. The apparatus of claim 10, wherein the spatial light modulator is a crystal liquid retarder that is electrically controllable.

12. The apparatus of claim 10, wherein, when the spatial light modulator is in the first status, light passing through the third birefringent elements proceeds towards the first eye viewing zone and light passing through the fourth birefringent elements proceeds towards the second eye viewing zone.

13. The apparatus of claim 12, wherein, when the spatial light modulator is in the third status, light passing through the third birefringent elements proceeds towards the second eye viewing zone and light passing through the fourth birefringent elements proceeds towards the first eye viewing zone.

14. The apparatus of claim 2, wherein the lenticular lens sheet comprises a plurality of vertical lenticular lens elements arranged along the horizontal direction and parallel to the first and second birefringent elements of the first birefringent element array.

15. The apparatus of claim 14, wherein a pitch between the vertical lenticular lens elements of the lenticular lens sheet is note greater than a pitch between pairs of the first and second birefringent elements of the first birefringent element array.

16. The apparatus of claim 14, wherein a distance between the lenticular lens sheet and the first birefringent element array is not less than a focal length of the vertical lenticular lens elements.

17. The apparatus of claim 14, wherein light passing through the first birefringent elements passes through the lenticular lens sheet to proceed towards the first eye viewing zone and light passing through the second birefringent elements passes through the lenticular lens sheet to proceed towards the second eye viewing zone.

18. The apparatus of claim 2, wherein the backlight unit and the spatial light modulator are each divided into a plurality of horizontal segments that are sequentially switched in synchronization with a vertical scanning time of the display panel.

19. The apparatus of claim 18, wherein the backlight unit and the spatial light modulator are divided such that a plurality of horizontal segments that are capable of being independently switched are arranged along the vertical direction, and the number of horizontal segments of the backlight unit is the same as the number of horizontal segments of the spatial light modulator.

20. The apparatus of claim 19, wherein corresponding horizontal segments of the backlight unit and the spatial light modulator are simultaneously switched.

21. The apparatus of claim 18, wherein the horizontal segments of each of the backlight unit and the spatial light modulator correspond to a plurality of pixel lines of the display panel.

22. The apparatus of claim 18, wherein the display panel displays an image for the first eye viewing zone of a first frame in odd pixel lines and an image for the second eye viewing zone of the first frame in even pixel lines and displays an image for the first eye viewing zone of a second frame in the even pixel lines and an image for the second eye viewing zone of the second frame in the odd pixel lines.

23. The apparatus of claim 22, wherein, in each horizontal segment of the spatial light modulator, the first and third statuses of the spatial light modulator are time-sequentially and alternately switched in synchronization with the display panel.

24. An autostereoscopic display apparatus comprising:
a backlight unit;
a polarizing plate disposed in front of the backlight unit;
a display panel which displays a left eye image and a right eye image by interlacing pixel lines of the left and right eye images alternately and sequentially;
a lenticular lens sheet, disposed between the polarizing plate and the display panel, which separates light emitted from the backlight unit into a left eye viewing zone and a right eye viewing zone; and
a polarization switch which controls a polarization direction of light proceeding towards the left eye viewing zone so that light is incident on pixel lines of the display panel displaying the left eye image and controls a polarization direction of light proceeding towards the right eye viewing zone so that light is incident on pixel lines of the display panel displaying the right eye image, in synchronization with a vertical scanning time of the display panel,
wherein the polarization switch comprises:
a spatial light modulator, disposed between the polarizing plate and the lens sheet, comprising a plurality of first vertical columns and second vertical columns that change the polarization direction of incident light, are independently controlled and alternately provided; and
a birefringent element array, disposed between the lenticular lens sheet and the display panel, comprising a plurality of first and second horizontal birefringent elements, alternating in the vertical direction, which change the polarization direction of incident light such that a polarization direction of light passing through the first birefringent elements is perpendicular to a polarization direction of light passing through the second birefringent elements.

25. The apparatus of claim 24, wherein the first and second horizontal birefringent elements of the birefringent element array each correspond to one of the pixel lines of the display panel.

26. The apparatus of claim 24, wherein the birefringent element array further comprises an opaque mask having a striped shape disposed between the first and second horizontal birefringent elements.

27. The apparatus of claim 24, wherein a pitch in the vertical direction between the first and second horizontal birefringent elements of the birefringent element array is greater than a pitch in the vertical direction between the pixel lines of the display panel.

28. The apparatus of claim 24, wherein the first and second horizontal birefringent elements each comprise a retarder that delays the phase of the incident light, wherein a phase delay difference of the retarders of the first horizontal birefringent elements and the retarders of the second horizontal birefringent elements is $\lambda/2$.

29. The apparatus of claim 24, wherein the spatial light modulator switches between a first status in which the first vertical columns do not change a polarization direction of incident light and the second vertical columns change a polarization direction of incident light by one of +90° and −90°; and a second status in which the first vertical columns change a polarization direction of incident light by one of +90° and −90° and the second vertical columns do not change a polarization direction of incident light.

30. The apparatus of claim 24, wherein the lenticular lens sheet comprises a plurality of vertical lenticular lens elements arranged along the horizontal direction and parallel to the vertical columns of the spatial light modulator.

31. The apparatus of claim 30, wherein a pitch between the vertical lenticular lens elements of the lenticular lens sheet is not greater than twice a pitch between the vertical columns of the spatial light modulator.

32. The apparatus of claim 30, wherein a distance between the lenticular lens sheet and the spatial light modulator is not less than a focal length of the vertical lenticular lens element.

33. The apparatus of claim 24, wherein the display panel repeatedly displays an image for the left eye of a first frame in odd pixel lines and an image for the right eye of the first frame in even pixel lines and displays an image for the left eye of a second frame in the even pixel lines and an image for the right eye of the second frame in the odd pixel lines.

34. The apparatus of claim 24, wherein the spatial light modulator comprises a plurality of horizontal segments that are sequentially switched in synchronization with a vertical scanning time of the display panel.

35. The apparatus of claim 34, wherein the spatial light modulator comprises:
a liquid crystal layer;
first and second vertical column electrodes disposed in the vertical direction on a front surface of the liquid crystal layer, facing each other in an interdigit array; and
a common electrode disposed on a rear surface of the liquid crystal layer,
wherein the common electrode comprises a plurality of horizontal segments.

* * * * *